(12) United States Patent
Sugiyama et al.

(10) Patent No.: US 6,408,806 B2
(45) Date of Patent: Jun. 25, 2002

(54) VARIABLE VALVE OPERATING SYSTEM OF INTERNAL COMBUSTION ENGINE ENABLING VARIATION OF WORKING ANGLE AND PHASE

(75) Inventors: Takanobu Sugiyama; Tsuneyasu Nohara, both of Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/874,052

(22) Filed: Jun. 6, 2001

(30) Foreign Application Priority Data

Jun. 12, 2000 (JP) ........................................ 2000-174733

(51) Int. Cl.[7] .................................................. F01L 1/34
(52) U.S. Cl. ............................. 123/90.15; 123/90.12; 123/90.17; 123/90.18; 123/90.16
(58) Field of Search ........................... 123/90.17, 90.18, 123/90.15, 90.16

(56) References Cited

U.S. PATENT DOCUMENTS

| | | | | |
|---|---|---|---|---|
| 3,633,554 A | * | 1/1972 | Nakajima et al. | 123/90.18 |
| 3,730,150 A | * | 5/1973 | Codner | 123/90.18 |
| 3,786,792 A | * | 1/1974 | Pelizzoni et al. | 123/97 B |
| 4,258,672 A | * | 3/1981 | Hietikko | 123/90.18 |
| 4,723,516 A | | 2/1988 | Slagley et al. | 123/90.16 |
| 5,031,583 A | | 7/1991 | Konno | 123/90.16 |
| 5,398,502 A | | 3/1995 | Watanabe | 60/284 |
| 5,497,737 A | | 3/1996 | Nakamura | 123/90.15 |
| 5,531,193 A | * | 7/1996 | Nakamura | 123/90.15 |
| 5,809,952 A | * | 9/1998 | Ono et al. | 123/90.16 |
| 5,823,152 A | | 10/1998 | Ushida | 123/90.17 |
| 5,960,755 A | | 10/1999 | Diggs et al. | 123/90.15 |
| 6,250,266 B1 | * | 6/2001 | Okui et al. | 123/90.17 |

FOREIGN PATENT DOCUMENTS

| | | | | |
|---|---|---|---|---|
| EP | 0 520 801 | 12/1992 | | |
| EP | 0 735 246 | 10/1996 | | |
| EP | 0 854 273 | 7/1998 | | |
| JP | 55087811 A | * | 7/1980 | 123/90.15 |
| JP | 59-103910 | 6/1984 | | |
| JP | 7-109934 | 4/1995 | | |

OTHER PUBLICATIONS

10 Best Engines 2002, pp 29–43, WARD's Auto World, Jan., 2002.*

* cited by examiner

*Primary Examiner*—Thomas Denion
*Assistant Examiner*—Ching Chang
(74) *Attorney, Agent, or Firm*—Foley & Lardner

(57) ABSTRACT

A valve operating system of an internal combustion engine enabling both valve working angle and phase to be varied, includes a variable working angle control mechanism being responsive to a supply pressure of working fluid to adjust a working angle of an intake valve, and a variable phase control mechanism being responsive to a supply pressure of working fluid to adjust a phase of the working angle of the intake valve. A control unit controls the supply pressure to each of the control mechanisms depending on engine operating conditions. In a cold-engine state that the temperature of working fluid is below a predetermined temperature, an intake valve open timing is retarded in comparison with a predetermined stability-limit valve open timing, by limiting a controlled variable of at least one of the control mechanisms.

15 Claims, 20 Drawing Sheets

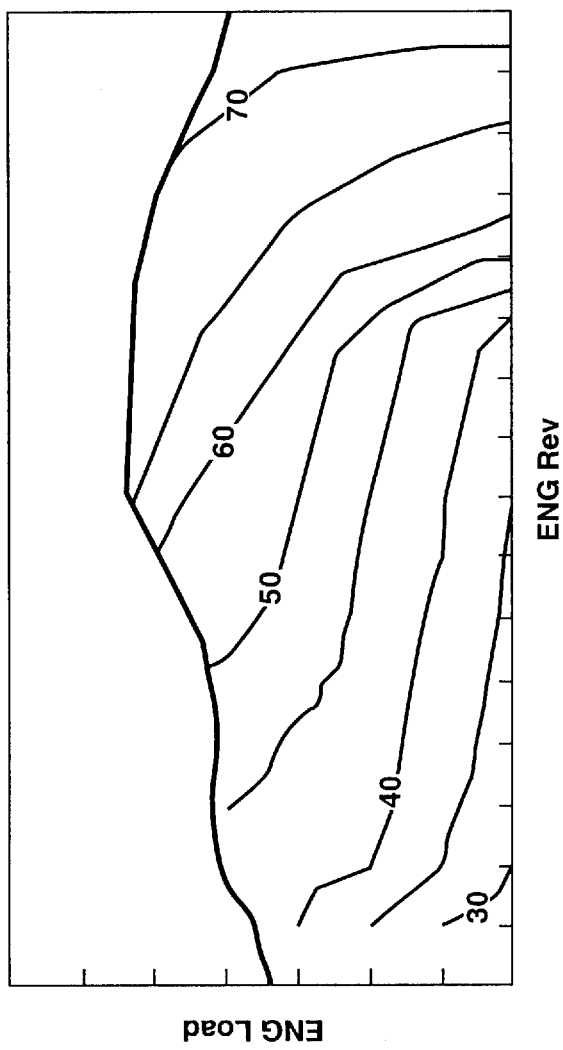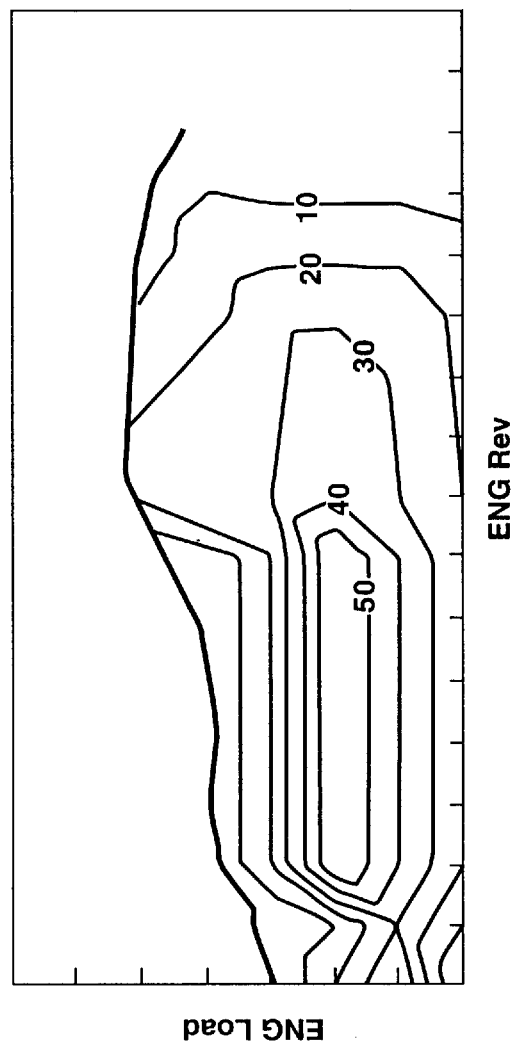
FIG.8A HOT-ENGINE WORKING ANGLE CONTROL MAP A
FIG.8B HOT-ENGINE PHASE CONTROL MAP C

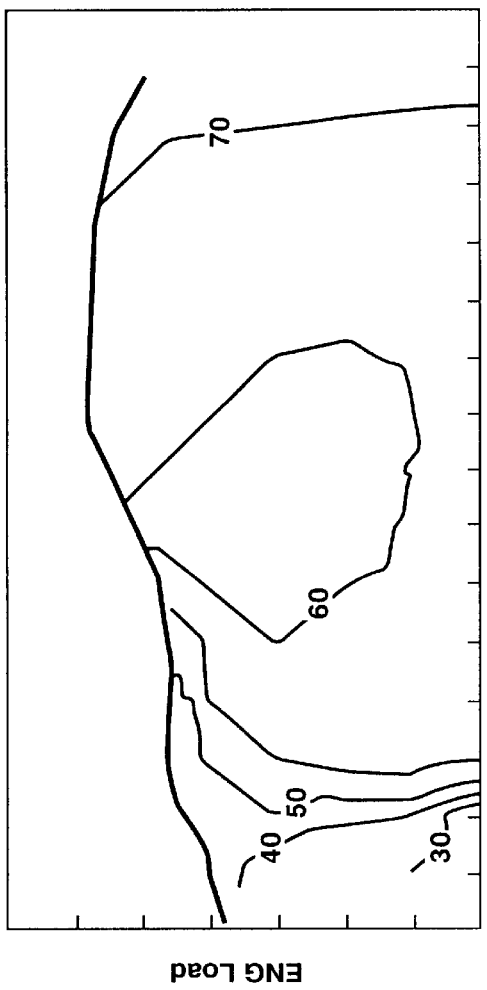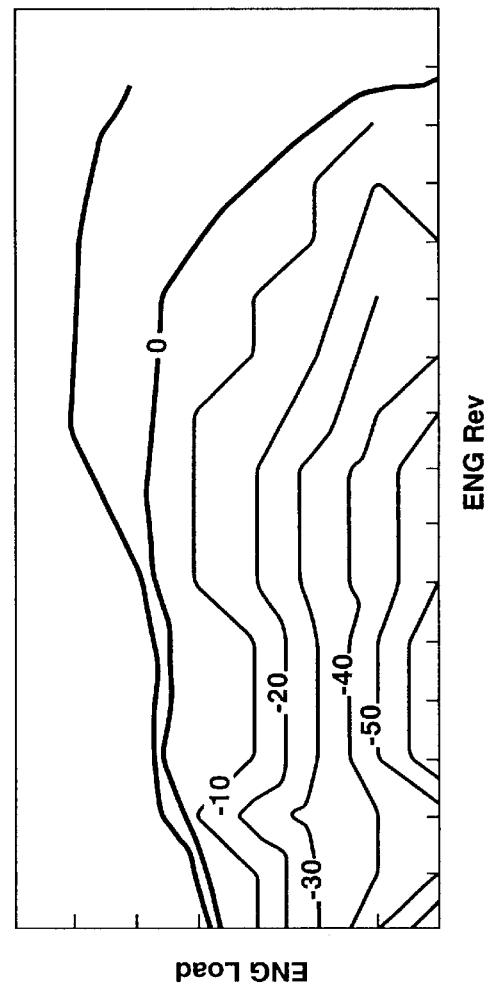
FIG.17A HOT-ENGINE WORKING ANGLE CONTROL MAP A"
FIG.17B HOT-ENGINE PHASE CONTROL MAP C"

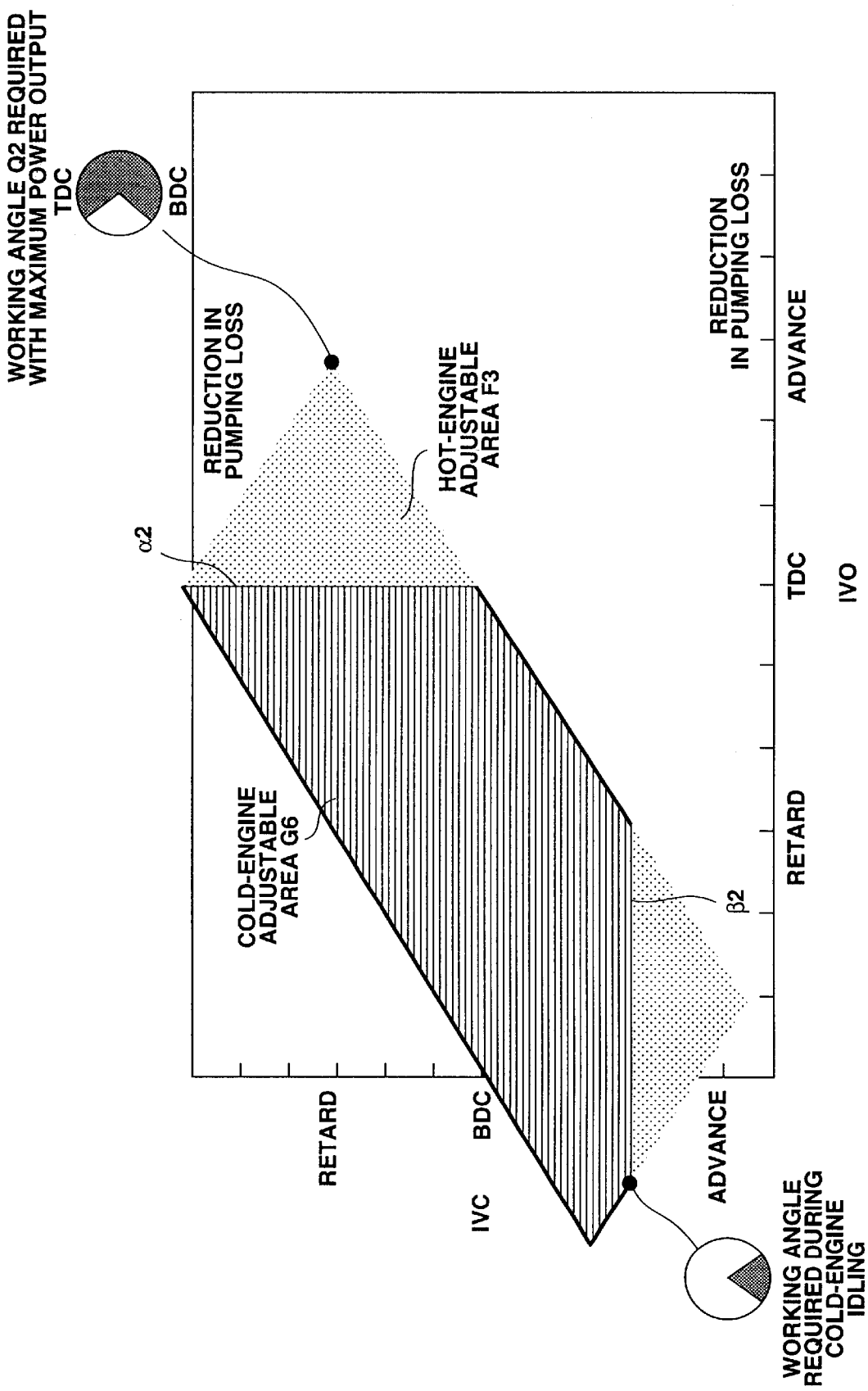

VARIABLE VALVE OPERATING SYSTEM OF INTERNAL COMBUSTION ENGINE ENABLING VARIATION OF WORKING ANGLE AND PHASE

TECHNICAL FIELD

The present invention relates to a variable valve operating system of an internal combustion engine enabling working angle and phase to be varied, and in particular being capable of changing both working angle and phase of engine valves depending on engine operating conditions, and specifically to a variable valve operating system employing a variable working angle control mechanism and a variable phase control mechanism both used for an intake valve.

BACKGROUND ART

The open periods of intake and exhaust valves are usually overlapped in the last stages of exhaust stroke. A valve overlap of predetermined degrees of crankshaft rotation is effective to enhance an air intake and exhaust efficiency. However, during the valve overlap at low load operation in which a negative pressure in the intake pipe develops greatly with a throttle valve kept at a relatively small value, there is a possibility of back-flow of a large amount of exhaust gases. This deteriorates combustion stability. Undesirably increased valve overlap causes rough idling. Therefore, it is desirable to variably control the valve overlap depending on engine operating conditions. Such a variable valve timing control system capable of variably controlling the valve overlap of an intake/exhaust valve has been disclosed in Japanese Patent Provisional Publication No. 59-103910 (hereinafter is referred to as JP59-103910). JP59-103910 teaches the positive use of internal exhaust gas recirculation (EGR) for the purpose of rapid activation of catalyst (improvement of catalyst temperature rise characteristic) during cold engine operation. Concretely, in order to increase the valve overlap and thus to enhance the internal EGR effect, during the cold engine operation, an intake valve open timing (IVO) and an intake valve closure timing (IVC) are both advanced, while an exhaust valve open timing (EVO) and an exhaust vale closure timing (EVC) are both fixed. This enhances a catalytic conversion efficiency during the cold engine operation. However, owing to the valve overlap increased by varying IVO and IVC, there is an increased tendency for unburned hydrocarbons adhered to the piston lands to be exhausted via the exhaust pipe to the atmosphere. To avoid this (i.e., to reduce hydrocarbon emission during cold engine operation), Japanese Patent Provisional Publication No. 7-109934 (hereinafter is referred to as JP7-109934) teaches the provision of advanced EVC as well as advanced IVO during the cold engine operation.

SUMMARY OF THE INVENTION

When using a hydraulically-operated actuator as an actuator for the variable intake-valve working angle control mechanism and/or the variable intake-valve phase control mechanism, the hydraulically-operated actuator provides several merits, for example, simplicity in construction, a great driving force, and the like. On the other hand, the hydraulically-operated actuator has demerits, e.g., a high coefficient of viscosity during cold engine starting, that is, a mechanical response delay. In particular, during the cold engine starting at low engine speeds, a discharge of working fluid discharged from a hydraulic pump serving as a working-fluid pressure source for the actuator is insufficient, and additionally the coefficient of viscosity of working fluid is high. During the cold engine starting period, if the valve overlap is positively controlled to a direction increasing the valve overlap by variably controlling the intake/exhaust valve timing, the actual valve overlap tends to be increased more excessively than need be. This lowers combustion stability. One way to improve the mechanical response delay of the actuator is to increase the discharge of working fluid from the hydraulic pump. In such a case, there are several problems, that is, an increased driving-torque loss, deteriorated fuel economy, and increased production costs. A combination of the variable working angle control for intake valve and the variable phase control for intake valve can offer a reduction in friction loss due to an effectively reduced working angle and a reduction in pumping loss due to effectively advanced IVC, thus improving fuel economy. Additionally, a valve lift can be set to a small value owing to the effectively reduced working angle. This helps atomization of fuel spray injected, thereby effectively reducing unburned hydrocarbons.

Accordingly, it is an object of the invention to provide a variable valve operating system of an internal combustion engine enabling working angle and phase to be varied, which avoids the aforementioned disadvantages.

It is another object of the invention to provide a variable valve operating system of an internal combustion engine employing a variable working angle control mechanism and a variable phase control mechanism both driven by a supply pressure of working fluid to variably control both working angle and phase of an intake valve, which is capable of ensuring further performance enhancement and effectively improving fuel economy, while avoiding excessive valve overlap and thus enhancing combustion stability even during cold engine operation in which a temperature of the working fluid is below a predetermined temperature value.

In order to accomplish the aforementioned and other objects of the present invention, a valve operating system of an internal combustion engine enabling both valve working angle and phase to be varied, the valve operating system comprises a working angle control mechanism which variably controls a working angle of an intake valve, a first actuator which drives the working angle control mechanism in response to a supply pressure of working fluid, a phase control mechanism which variably controls a phase of the working angle of the intake valve, a second actuator which drives the phase control mechanism in response to a supply pressure of working fluid, a temperature sensor which detects a temperature of the working fluid, a control section which controls the supply pressure to each of the first and second actuators, and the control section limiting a controlled variable of at least one of the working angle control mechanism and the phase control mechanism in a cold-engine state in which the temperature of the working fluid is less than a predetermined temperature value, as compared to a hot-engine state in which the temperature of the working fluid is greater than or equal to the predetermined temperature value.

According to another aspect of the invention, a valve operating system of an internal combustion engine enabling both valve working angle and phase to be varied, the valve operating system comprises a working angle control mechanism which variably controls a working angle of an intake valve, a first actuator which drives the working angle control mechanism in response to a supply pressure of working fluid, a phase control mechanism which variably controls a phase of the working angle of the intake valve, a second actuator which drives the phase control mechanism in response to a supply pressure of working fluid, a temperature sensor which detects a temperature of the working fluid, a control section which controls the supply pressure to each of the first and second actuators, and a valve open timing of the intake valve being retarded in comparison with a predetermined stability-limit valve open timing, in a cold-engine state in which the temperature of the working fluid is less than a predetermined temperature value.

According to a further aspect of the invention, in an internal combustion engine with a valve operating system enabling both valve working angle and phase to be varied, the valve operating system comprises a working angle control means for variably controlling a working angle of an intake valve, a first hydraulically-operated actuating means for driving the working angle control means in response to a supply pressure of working fluid, a phase control means for variably controlling a phase of the working angle of the intake valve, a second hydraulically-operated actuating means for driving the phase control means in response to a supply pressure of working fluid, a temperature sensing means for detecting a temperature of the working fluid, a control means for controlling the supply pressure to each of the first and second hydraulically-operated actuating means, and the control means preventing a controlled variable of at least one of the working angle control means and the phase control means from exceeding a predetermined limit only in a cold-engine state in which the temperature of the working fluid is less than a predetermined temperature value.

According to a still further aspect of the invention, a method for variably controlling both valve working angle and phase of an intake valve of an internal combustion engine with a valve operating system having both a working angle control mechanism variably controlling the working angle of the intake valve in response to a supply pressure of working fluid and a phase control mechanism variably controlling a phase of the working angle of the intake valve in response to a supply pressure of working fluid, the method comprises detecting a temperature of the working fluid, regulating the supply pressure for each of the working angle control mechanism and the phase control mechanism depending on engine operating conditions, discriminating, responsively to the temperature of the working fluid, that the engine is conditioned in one of a cold-engine state in which the temperature of the working fluid is less than a predetermined temperature value and a hot-engine state in which the temperature of the working fluid is greater than or equal to the predetermined temperature value, and preventing a controlled variable of at least one of the working angle control mechanism and the phase control mechanism from exceeding a predetermined limit only in the cold-engine state.

The other objects and features of this invention will become understood from the following description with reference to the accompanying drawings.

BRIEF DESCRIPTION OF THE DRAWINGS

FIG. 8A is a preprogrammed working angle control map (MAP A) for hot engine operation, stored in memories of an electronic control unit (ECU) incorporated in the variable working angle and phase control system of the first embodiment.

FIG. 8B is a preprogrammed phase control map (MAP C) for hot engine operation, stored in the memories of the electronic control unit incorporated in the variable working angle and phase control system of the first embodiment.

FIG. 17A is a preprogrammed working angle control map (MAP A") for hot engine operation, stored in the memories of the electronic control unit incorporated in the variable working angle and phase control system of the fourth embodiment.

FIG. 17B is a preprogrammed phase control map (MAP C") for hot engine operation, stored in the memories of the electronic control unit incorporated in the variable working angle and phase control system of the fourth embodiment.

FIG. 20 is a predetermined IVO-IVC characteristic map which is used within a variable working angle and phase control system of a sixth embodiment of the present invention and shows a left-hand side adjustable area G6 suitable for cold engine operation, the area G6 being limited in comparison with the adjustable area F3 suitable for hot engine operation and indicated by a hatched parallelogram area.

DESCRIPTION OF THE PREFERRED EMBODIMENTS

Figure 1:
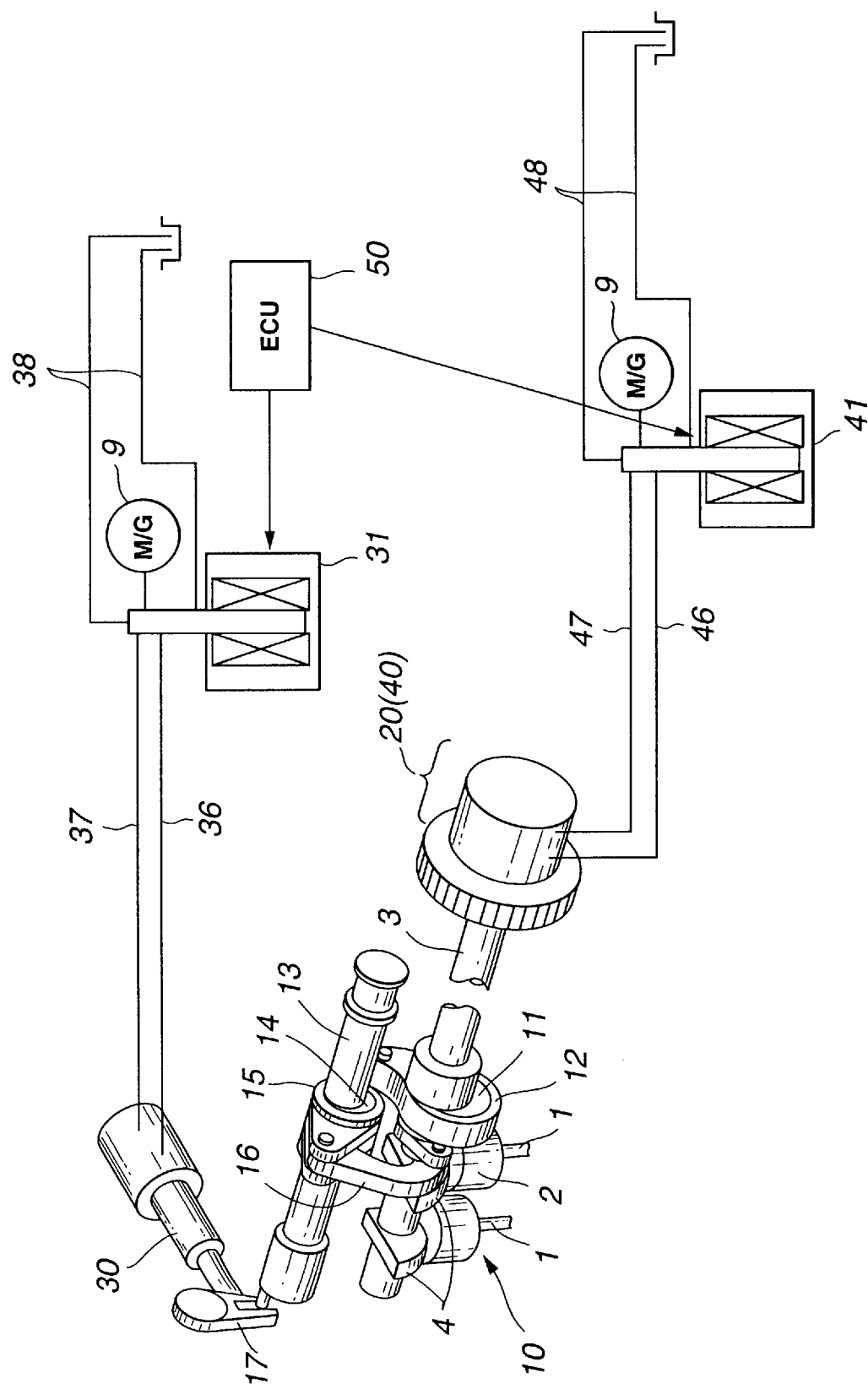
FIG. 1 is a system block diagram showing one embodiment of the variable valve operating system of the invention.

Referring now to the drawings, particularly to FIG. 1, the variable valve operating system of the invention is exemplified in a gasoline engine. As shown in FIG. 1, a pair of intake valves 1 and a pair of exhaust valves (not numbered) are provided for each engine cylinder. A valve lifter 2 is located above each of the intake valves 1. A drive shaft 3 is located above the valve lifter 2 in a manner so as to extend in a direction of a cylinder row. Drive shaft 3 has a driven connection with an engine crankshaft (not shown), so that the drive shaft rotates about its axis during rotation of the crankshaft. A rockable cam 4 is oscillatingly fitted onto the outer periphery of drive shaft 3 so that the cam-contour surface of the rockable cam is cam-connected to the associated intake valve 1. Therefore, two rockable cams (4, 4) are located above the respective intake valves of each engine cylinder. The intake valve is moved up and down (opened and closed) by the oscillating motion of rockable cam 4. Actually, when the intake valve is moved down against the spring bias of a valve return spring according to the oscillating motion of rockable cam 4, the intake valve opens. Conversely, when the intake valve is moved up by way of the spring bias of the return spring, the intake valve is closed. As can be seen from the system block diagram of FIG. 1, the variable valve operating system of the embodiment includes a variable working angle control mechanism 10 that variably controls or adjusts the working angle (valve open period) of intake valve 1, and a variable phase control mechanism 20 that variably controls or adjusts the phase of working angle of intake valve 1. The phase of working angle means an angular phase at the maximum valve lift point (often called "central angle"). The variable valve operating system of the embodiment also includes a working angle control actuator 30 that drives the variable working angle control mechanism 10 in response to a supply pressure of working oil (working fluid), a phase control actuator 40 that drives the variable phase control mechanism 20 in response to a supply pressure of working oil (working fluid), and a control section (that is, engine control unit ECU 50) that controls both the supply pressure supplied to the working angle control actuator 30 by means of a solenoid valve 31 and the supply pressure supplied to the phase control actuator 40 by means of a solenoid valve 41. An oil pump 9 serves as a fluid pressure source for the actuators 30 and 40. The discharge port of oil pump 9 is connected to the solenoid valves 31 and 41. Variable working angle control mechanism 10 is provided between drive shaft 3 and rockable cam pair (4, 4), for changing the attitude of a linkage via which the drive shaft is mechanically linked to each of rockable cams (4, 4), and for continuously changing the working angle and valve lift of intake valve 1. Variable working angle control mechanism 10 is comprised of a drive cam 11, a ring-shaped link (first link) 12, a control shaft 13, a control cam 14, a rocker arm 15, and a rod-shaped link (second link) 16. Drive cam 11 is fixedly connected to drive shaft 3 so that the axis of the drive cam is eccentric to the axis of the drive shaft and that the drive shaft rotates together with the drive cam. Ring-shaped link (first link) 12 is fitted to the outer periphery of drive cam 11, so that first link 12 is rotatable relative to drive cam 11. Control shaft 13 is laid out substantially parallel to drive shaft 3 in such a manner as to extend in the direction of the cylinder row. Control cam 14 is fixedly connected to control shaft 13 so that the axis of the control cam is eccentric to the axis of the control shaft and that the control shaft rotates together with the control cam. Rocker arm 15 is fitted to the outer periphery of control cam 14 so that rocker arm 15 is rotatable relative to control cam 14. One end of rocker arm 15 is linked or pin-connected to a tip end of first link 12 so as to be rotatable relative to the first link. Second link 16 mechanically links rocker arm 15 to rockable cam 4 therevia. Concretely, one end of second link 16 is rotatably linked or pin-connected to the other end of rocker arm 15, whereas the other end of second link 16 is rotatably linked or pin-connected to the tip end of rockable cam 4. A journal portion of drive shaft 3 and a journal portion of control shaft 13 are rotatably supported on the cylinder head by means of a journal bearing bracket (not shown) and mounting bolts (not shown). The output side of working angle control actuator 30 is linked to one end of control shaft 13, for driving control shaft 13 to a desired angular position within a predetermined controllable angular range, and for holding control shaft 13 at the desired angular phase. With the previously-noted arrangement, when drive shaft 3 rotates in synchronism with rotation of the engine crankshaft, rotational motion of the center (or the axis) of eccentric cam 11 with respect to the center (or the axis) of drive shaft 3 results in a translation motion of first link member 12. Responsively to the translation motion of first link member 12, rocker arm 15 oscillates or rocks about the center of control cam 14. That is, the center of control cam 14 serves as a center of oscillating motion of rocker arm 15. In the same manner, rockable cam 4 oscillates or rocks through second link member 16. At this time, the cam surface of rockable cam 4 is in sliding-contact with the upper surface of valve lifter 2 which is located on the upper end (valve stem end) of intake valve 1 and serves as a force-transmission member, and thus the intake valve is able to close and open in synchronism with rotation of the engine crankshaft by moving up and down the valve lifter by the aid of and against the bias of the valve spring (not shown). That is to say, first link 12, rocker arm 15, and second link 16 cooperate with each other to construct a power-transmission mechanism via which drive cam 11 and rockable cam 4 are mechanically linked to each other.

On the other hand, when control shaft 13 is rotated or driven toward a desired angular position based on the engine operating conditions by means of working angle control actuator 30, the center of control cam 14, i.e., the center of oscillating motion of rocker arm 15, shifts or rotates relative to the center of control shaft 13. Thus, the attitude of each of the first and second links varies, and as a result the angular range of oscillating motion of rockable cam 4 also varies. As a consequence, the working angle and valve lift of intake valve 1 vary continuously, while the angular phase at the central angle of working angle remains substantially constant. In variable working angle control mechanism 10 shown in FIG. 1, the sliding-contact portions between drive cam 11 and ring-shaped link (first link) 12 are in wall-contact with each other. Also, the sliding-contact portions between control cam 14 and rocker arm 15 are in wall-contact with each other. Such wall contact facilitates lubrication, thus enhancing the durability and reliability of the system, and also reducing the frictional resistance of the sliding portions during working angle control. Additionally, rockable cams (4, 4) for intake valve 1 are arranged coaxially with respect to drive shaft 3. The coaxial layout of the rockable cams ensures a high accuracy of working angle control, and the system (in particular, the variable working angle control system) itself can be designed compactly. This ensures a simplicity of installation of the working angle control system on the vehicle and reduces the number of component parts of the system.

Figure 2:
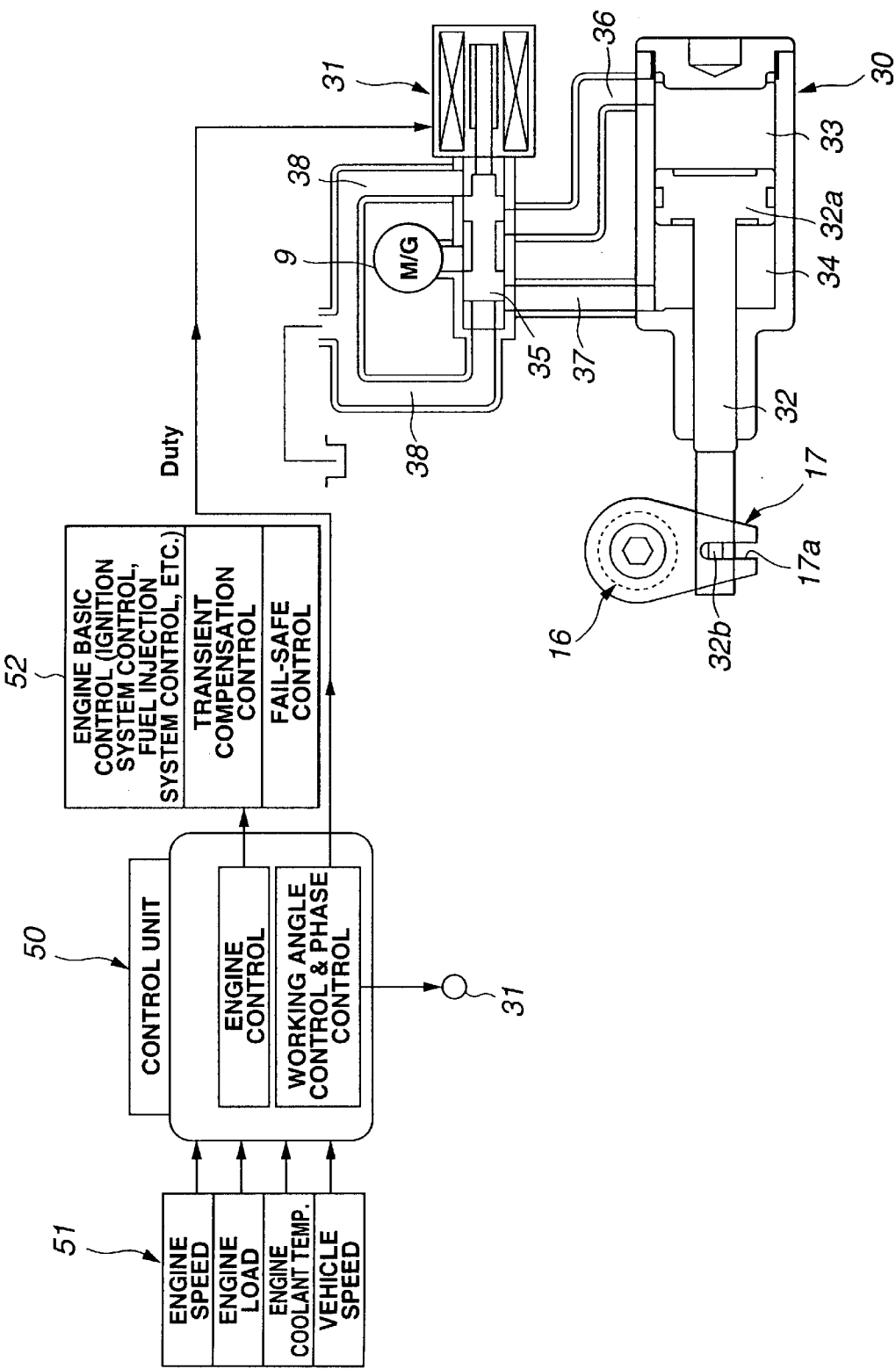
FIG. 2 is a system operational block diagram showing the system component layout for variable working angle control of the variable valve operating system of the embodiment.

Referring now to FIG. 2, there is shown the system component layout of variable working angle control of the system of the embodiment. As can be seen from the internal construction of the working angle control actuator 30 shown in the right-hand half of FIG. 2, the internal space of the substantially cylindrical body of actuator 30 is divided into a first hydraulic pressure chamber 33 and a second hydraulic pressure chamber 34 by a pressure-receiving portion 32a of a piston 32. A pin 32b is fixedly connected to the free end of the piston rod of piston 32, so that the pin extends perpendicular to the axis of the piston rod. A disk 17 is fixedly connected to one end of control shaft 13. Disk 17 is formed with a radially-extending slotted groove 17a. Pin 32b is slidably fitted into radial groove 17a. As appreciated, piston 32 can move back and forth in response to the supply pressure to first hydraulic pressure chamber 33 and the supply pressure to second hydraulic pressure chamber 34. As discussed above, the working angle of intake valve 1 can be changed by rotating the control shaft 13 by means of pin 32b and disk 17. Actually, the supply pressure to each of hydraulic pressure chambers 33 and 34 can be changed depending on the axial position of a spool 35 of solenoid valve 31. The axial position (or power movement) of the spool of solenoid valve 31 can be changed by way of pulsewidth modulated control (duty-cycle control) based on a duty cycle of a pulsewidth modulated signal (output signal) generated from engine control unit 50. In order to change the axial position of the spool of solenoid valve 31, the control unit changes the duty ratio of the pulsewidth modulated signal depending upon the engine operating conditions. Under a condition where spool 35 is kept at the rightmost position (viewing FIG. 2), a first oil passage 36, communicating first hydraulic pressure chamber 33, is communicated with the discharge port of oil pump 9, and thus the discharge pressure from oil pump 9 is supplied to first hydraulic pressure chamber 33. At the same time, a second oil passage 37, communicating second hydraulic pressure chamber 34, is communicated with a drain passage 38 and thus the working fluid in second hydraulic pressure chamber 34 is drained. As a result, piston 32 of working angle control actuator 30 moves leftwards (viewing FIG. 2). Conversely, when spool 35 is kept at the leftmost position, first oil passage 36 is communicated with drain passage 38, while second oil passage 37 is communicated with the discharge port of oil pump 9. In this case, the working fluid in first hydraulic pressure chamber 33 is drained and simultaneously the discharge pressure from oil pump 9 is supplied to second hydraulic pressure chamber 34. As a result, piston 32 moves rightwards (viewing FIG. 2). Under a condition where spool 35 is held midway between the rightmost and leftmost positions, the port of first oil passage 36 and the port of second oil passage 37 are closed by the lands of spool 35. Therefore, actuator 30 is maintained at its hold-pressure mode in which the hydraulic pressure in first hydraulic pressure chamber 33 and the hydraulic pressure in second hydraulic pressure chamber 34 remain unchanged. In this case, the axial position of the rod of piston 32 is kept constant. In this manner, it is possible to change or hold the working angle of intake valve 1 to or at a desired working angle corresponding to the duty cycle of the pulsewidth modulated signal from the ECU by properly moving rightwards or leftwards or holding the axial position of the rod of piston 32 of actuator 30. As set forth above, the working angle control mechanism 10 and its actuator 30 are simple in construction, but insure the enhanced degree of freedom in variable working angle control. As clearly shown in the left-hand half of FIG. 2, control unit 50 receives input information, that is, operating conditions sensed by engine/vehicle sensors 51 or estimated by signals from the sensors, for example, engine speed, engine load, engine temperature (engine coolant temperature or water temperature), and vehicle speed. Depending on the operating conditions sensed or estimated, ECU 50 executes the working angle control via variable working angle control mechanism 10 and working angle control actuator 30, and executes the phase control via variable phase control mechanism 20 and phase control actuator 40. In addition to the above, the output side of ECU 50 are connected to various systems 52 controlled. For instance, for the engine basic control, the output interface of ECU 50 is connected to an electronic ignition system and an electronic fuel injection system. ECU 50 also executes a fail-safe control mode, as needed. Additionally, during transient operating conditions, such as during cranking and starting period, or when acceleration enrichment is required, ECU 50 initiates transient compensation operating mode to improve a transient response.

Figure 3:
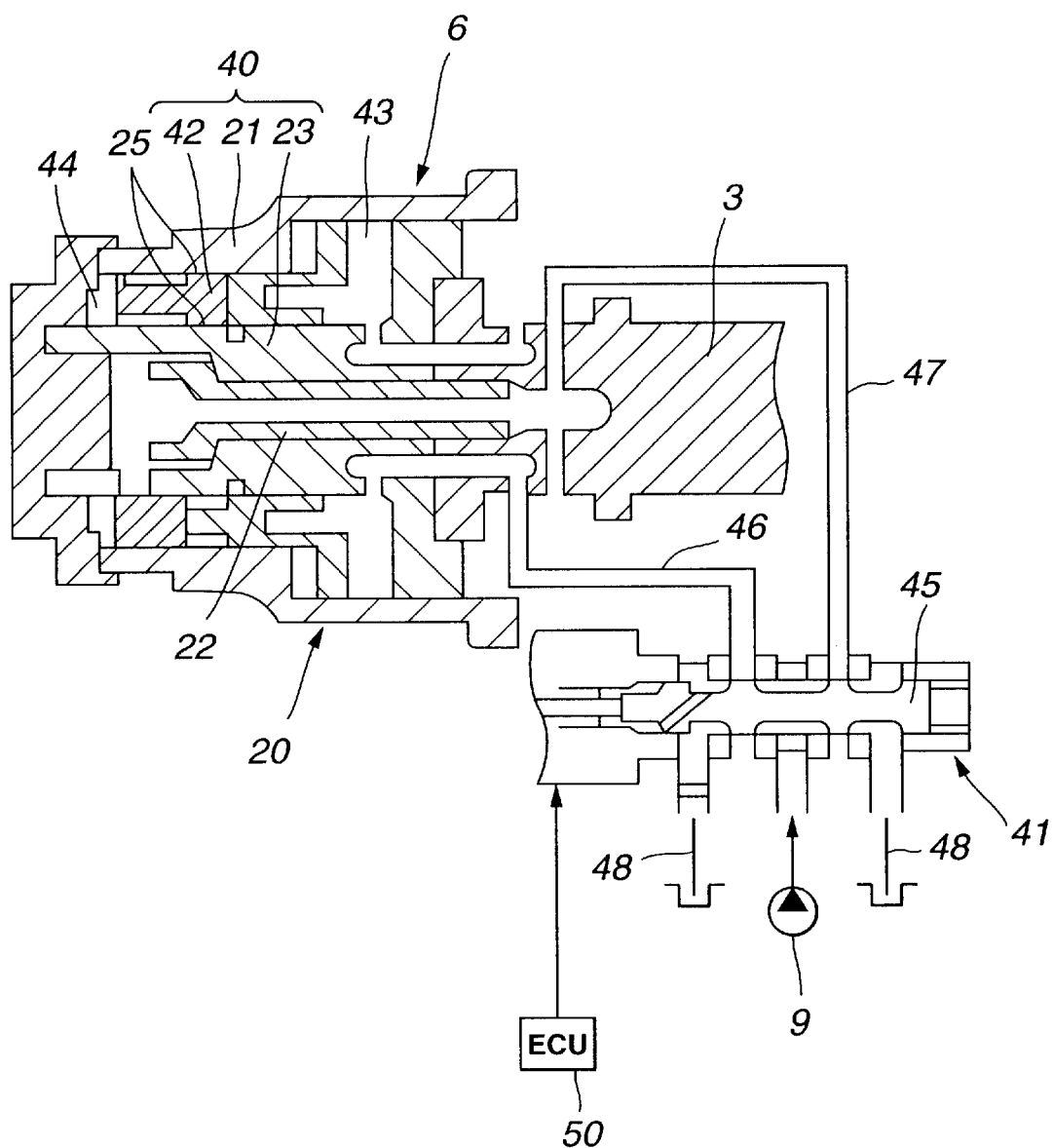
FIG. 3 is a longitudinal cross sectional view showing the detailed structure of the variable phase control mechanism of the variable valve operating system of the embodiment.

The detailed construction of variable phase control mechanism 20 is described hereunder in reference to FIG. 3. A cam sprocket (or a cam pulley) 6 is coaxially arranged on the outer periphery of the front end of drive shaft 3. The cam sprocket is driven from the crankshaft by means of a chain or a belt. That is, the cam sprocket rotates in synchronism with rotation of the crankshaft. Variable phase control mechanism 20 includes an outer cylindrical portion 21, an inner cylindrical portion 23, and an axially movable ring-shaped piston 42. Outer cylindrical portion 21 is formed integral with the inner periphery of cam sprocket 6. Inner cylindrical portion 23 is fixedly connected to the end of drive shaft 3 by means of a cylindrical-hollow bolt 22, so that inner cylindrical portion 23 is coaxial with and rotates together with drive shaft 3. Ring-shaped piston 42 is interleaved between outer cylindrical portion 21 and inner cylindrical portion 23, such that the ring-shaped piston is moveable axially. The inner peripheral wall surface of piston 42 is formed as internal helical splines or an internal helical gear. The outer peripheral wall surface of inner cylindrical portion 23 is formed as external helical splines or an external helical gear. The internal helical gear of piston 42 is in meshed-engagement with the external helical gear of inner cylindrical portion 23. On the other hand, the outer peripheral wall surface of piston 42 is formed as external helical splines or an external helical gear. The inner peripheral wall surface of outer cylindrical portion 21 is formed as internal helical splines or an internal helical gear. The external helical gear of piston 42 is in meshed-engagement with the internal helical gear of outer cylindrical portion 21. Inner and outer cylindrical portions 23 and 21 are concentrically arranged with each other. By way of the two helically meshing pairs (25, 25), the axial movement of piston 42 in the internal space defined between inner and outer cylindrical portions 23 and 21, is converted into relative rotational movement between inner and outer cylindrical portions 23 and 21. Helical splines (25, 25) functions as an axial-movement to relative rotational movement converter. The relative angular phase of inner cylindrical portion 23 to outer cylindrical portion 21 can be continuously changed depending on the axial position of piston 42. That is, the relative angular phase of drive shaft 3 to cam sprocket 6 can be continuously changed by changing the axial position of piston 42. As a result, it is possible to continuously change the phase at the central angle of working angle of intake valve 1, while keeping the working angle of intake valve 1 constant, by operating variable phase control mechanism 20. Piston 42 is axially shifted responsively to the supply pressure to first hydraulic pressure chamber 43 and the supply pressure to second hydraulic pressure chamber 44. That is, phase control actuator 40 is constructed mainly by inner and outer cylindrical portions 23 and 21, and piston 42. As can be appreciated from the above, the variable phase control system (in particular, variable phase control mechanism 20 and phase control actuator 40) can be designed compactly, thus ensuring a simplicity of installation of the phase control system on the vehicle and reducing the number of component parts of the system. Even when the previously-noted variable working angle control system is combined with the variable phase control system, it is possible to ensure a simplicity of installation of both the working angle control system and the phase control system on the vehicle and to enhance a simplicity of system design. Actually, the supply pressure to each of hydraulic pressure chambers 43 and 44 can be changed depending on the axial position of a spool 45 of solenoid valve 41. The axial position (or power movement) of the spool of solenoid valve 41 can be changed by way of pulsewidth modulated control (duty-cycle control) based on a duty cycle of a pulsewidth modulated signal (output signal) generated from engine control unit 50. In order to change the axial position of the spool of solenoid valve 41, the control unit changes the duty ratio of the pulsewidth modulated signal depending upon the engine operating conditions. Under a condition where spool 45 is kept at the leftmost position (viewing FIG. 3), a first oil passage 46, communicating first hydraulic pressure chamber 43, is communicated with the discharge port of oil pump 9, and thus the discharge pressure from oil pump 9 is supplied to first hydraulic pressure chamber 43. At the same time, a second oil passage 47, communicating second hydraulic pressure chamber 44, is communicated with a drain passage 48 and thus the working fluid in second hydraulic pressure chamber 44 is drained. As a result, piston 42 of phase control actuator 40 moves leftwards (viewing FIG. 3). Conversely, when spool 45 is kept at the rightmost position, first oil passage 46 is communicated with drain passage 48, while second oil passage 47 is communicated with the discharge port of oil pump 9. In this case, the working fluid in first hydraulic pressure chamber 43 is drained and simultaneously the discharge pressure from oil pump 9 is supplied to second hydraulic pressure chamber 44. As a result, piston 42 moves rightwards (viewing FIG. 3). Under a condition where spool 45 is held midway between the rightmost and leftmost positions, the port of first oil passage 46 and the port of second oil passage 47 are closed by the lands of spool 45. Therefore, actuator 40 is maintained at its hold-pressure mode in which the hydraulic pressure in first hydraulic pressure chamber 43 and the hydraulic pressure in second hydraulic pressure chamber 44 remain unchanged. In this case, the axial position of the rod of piston 42 is kept constant. In this manner, it is possible to change or hold the phase of working angle of intake valve 1 to or at a desired phase corresponding to the duty cycle of the pulsewidth modulated signal from the ECU by properly moving rightwards or leftwards or holding the axial position of the rod of piston 42 of actuator 40. As set forth above, the phase control mechanism 20 and its actuator 40 are simple in construction, but insure the enhanced degree of freedom in phase control.

The control action executed by the variable working angle and phase control system of the first embodiment is hereinafter described in detail with reference to FIGS. 4 through 9.

Figure 4:
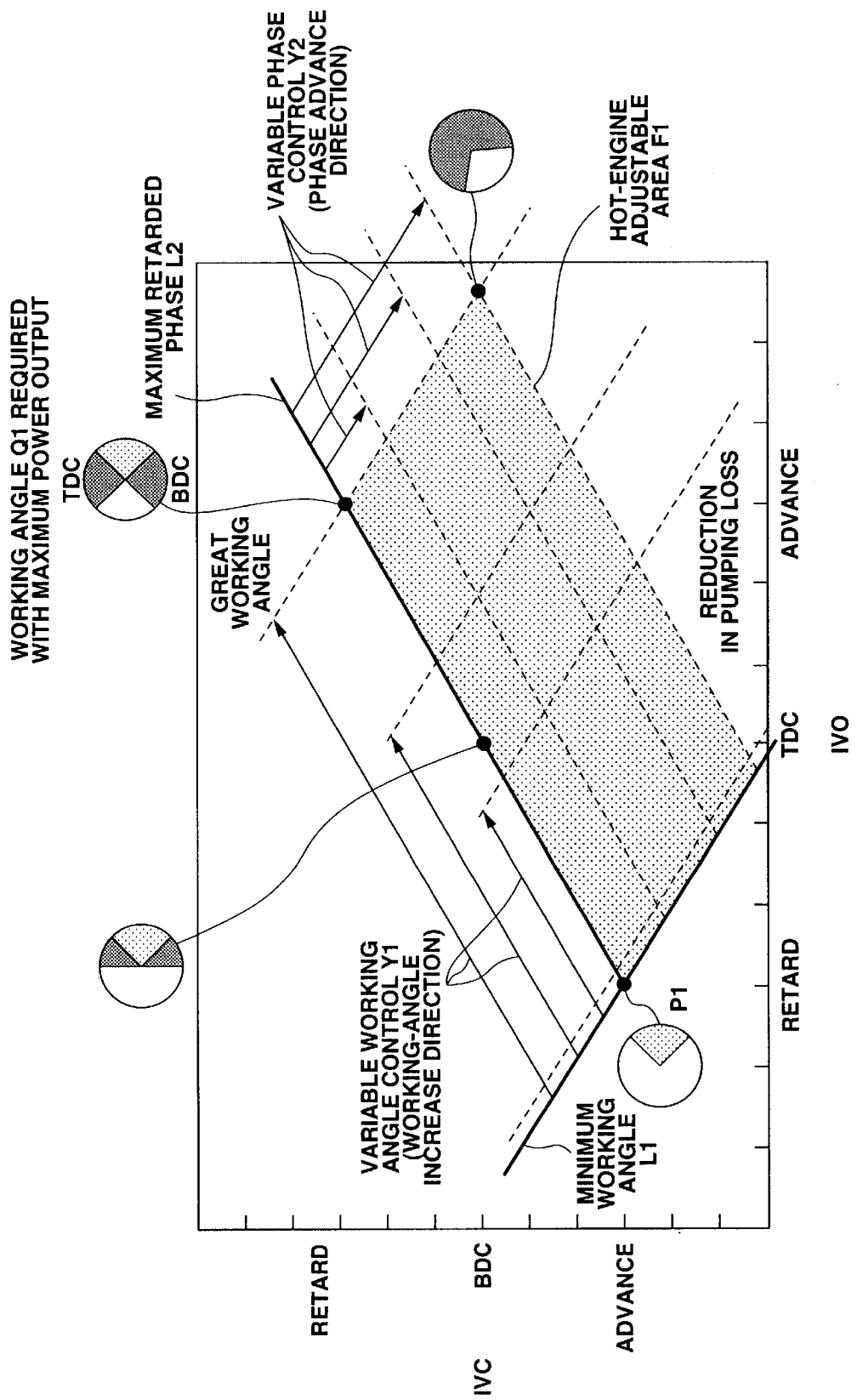
FIG. 4 is a predetermined IVO-IVC adjustable area characteristic map used within a variable working angle and phase control system of a first embodiment of the present invention.
Figure 5:
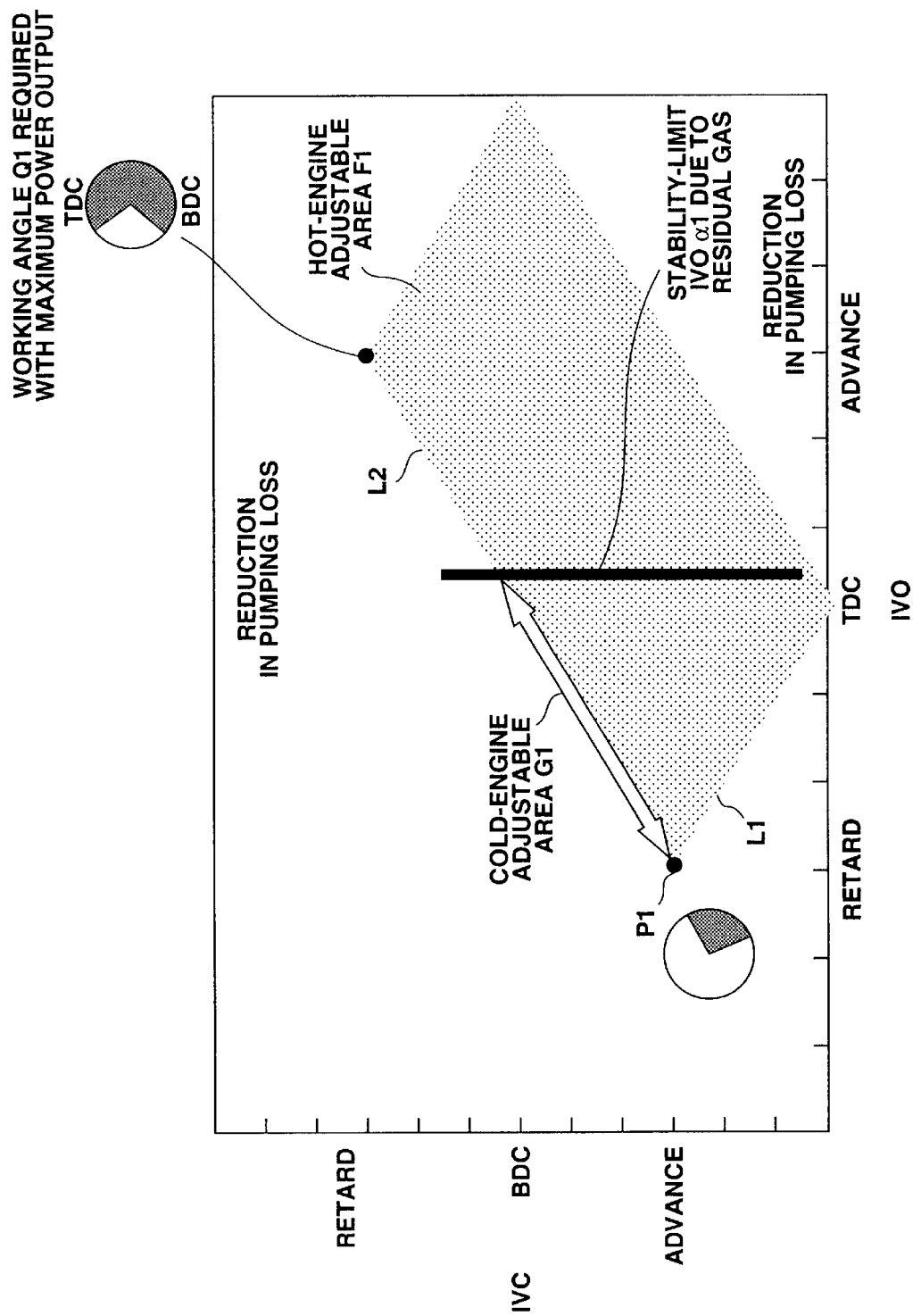
FIG. 5 is a predetermined IVO-IVC characteristic map showing a left-hand side adjustable area G1 suitable for cold engine operation, the area G1 being limited in comparison with the adjustable area F1 suitable for hot engine operation and indicated by a hatched parallelogram area.
Figure 6:
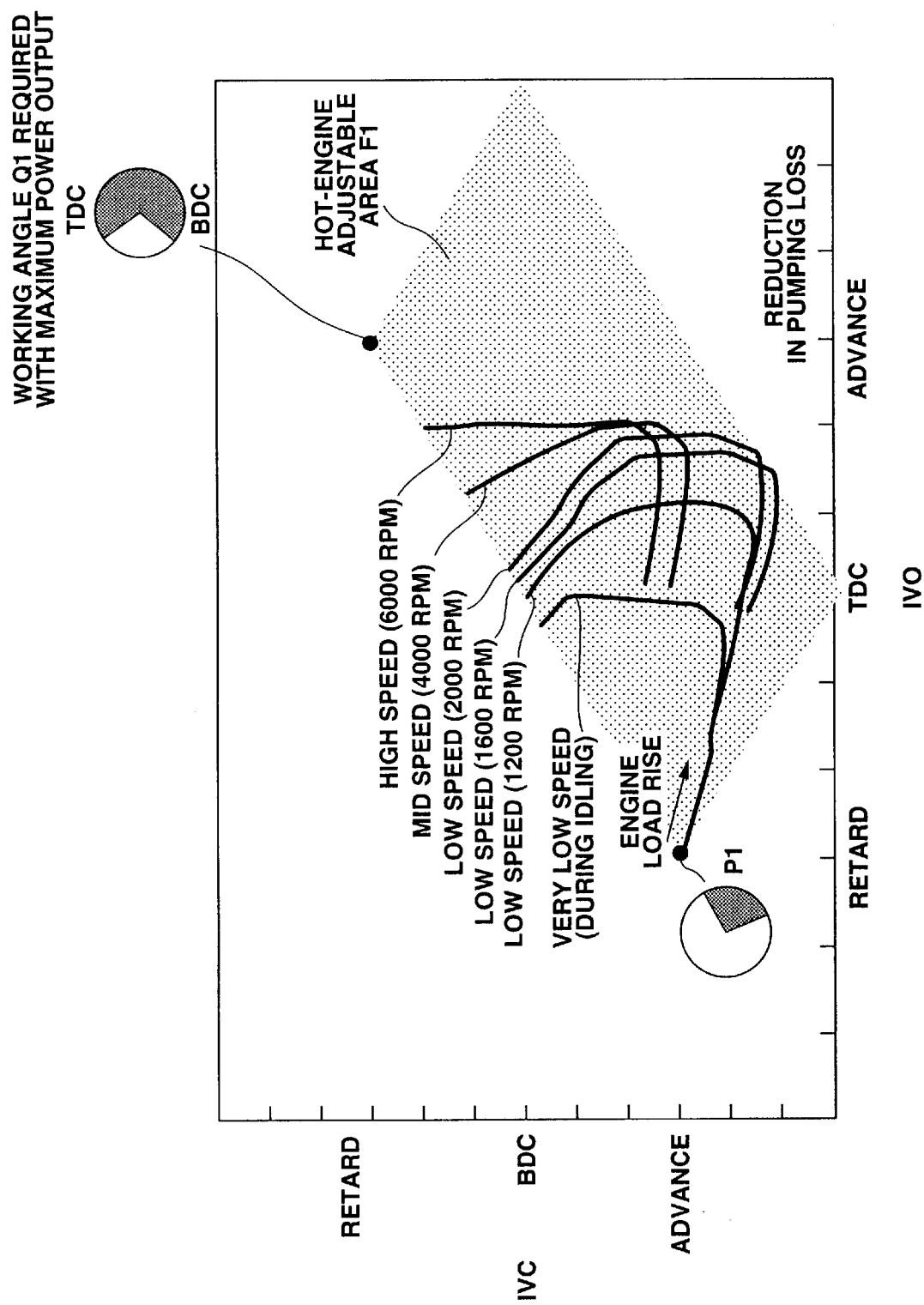
FIG. 6 is a characteristic map showing variations of the intake valve open timing (IVO) and intake valve closure timing (IVC) during the hot engine operation, on the predetermined IVO-IVC adjustable area characteristic map of FIG. 4.

FIG. 4 shows an example of the predetermined IVO-IVC adjustable area (controllable area or operable area) characteristic map used in the variable working angle/phase control system of the first embodiment. In FIG. 4, the abscissa (x-coordinate) indicates the intake valve open timing (IVO) of intake valve 1, whereas the ordinate (y-coordinate) indicates the intake valve closure timing (IVC) of intake valve 1. The hatched parallelogram area of FIGS. 4 through 6 corresponds to the predetermined or preprogrammed IVO-IVC adjustable area F1 within which both of the IVO and IVC of intake valve 1 can be variably controlled or adjusted. Preprogrammed IVO-IVC adjustable area F1 means an IVO/IVC adjustable area suitable for hot engine operation in which the temperature of working fluid is greater than or equal to a predetermined temperature value, for instance, when the engine is fully warmed up after the engine warm-up and thus the engine is hot. The arrows Y1 of FIG. 4 indicate a direction for a working angle change (i.e., a working angle increase) of intake valve 1 performed by variable working angle control mechanism 10. The arrows Y2 of FIG. 4 indicate a direction for a phase change (i.e., phase advance) of intake valve 1 performed by variable phase control mechanism 20. Circle graphs of FIGS. 4, 5, and 6 schematically indicate the IVO and IVC of intake valve 1 at various states of variable working angle/phase control, for example, an initial state P1 of the variable working angle/phase control, a maximum output state Q1, and the like. As shown in FIGS. 4 and 5, in the variable working angle and phase control system of the first embodiment, variable working angle control mechanism 10 is kept at its initial set position that corresponds to a predetermined minimum working angle L1, when the engine is stopped and thus output signals from ECU are not being sent to solenoid valves 31 and 41. Similarly, variable phase control mechanism 20 is kept at its initial set position that corresponds to a predetermined maximum retarded phase L2, when the engine is stopped and thus output signals from ECU are not being sent to solenoid valves 31 and 41. In other words, in the initial state P1 wherein variable working angle control mechanism 10 and variable phase control mechanism 20 are both inoperative, control mechanisms 10 and 20 are kept at their initial set positions, respectively corresponding to predetermined minimum working angle L1 and predetermined maximum retarded phase L2. That is, the working angle of intake valve 1 can be changed or increased from the predetermined minimum working angle L1 (obtained at the initial state P1) towards the desired working angle determined based on a duty cycle of a pulsewidth modulated signal from ECU 50, as indicated by the arrow Y1 by driving the variable working angle control mechanism. As can be seen from the three circle graphs except the rightmost circle graph of FIG. 4, note that the angle of the sector of each of the three circle graphs increases, as the controlled variable of the working angle control develops in the direction indicated by the arrow Y1. On the other hand, the phase of intake valve 1 can be changed or advanced from the predetermined maximum retarded phase L2 towards the desired phase determined based on a duty cycle of a pulsewidth modulated signal from ECU 50, as indicated by the arrow Y2 by driving the variable phase control mechanism. As can be seen from the right-hand side two circle graphs containing the rightmost circle graph of FIG. 4, note that the angle of the sector of each of these circle graphs remains unchanged and that only the phase of working angle (precisely, the phase at the central angle of working angle) changes or advances toward the maximum advanced point, as the controlled variable of the phase control develops in the direction indicated by the arrow Y2. Therefore, by a combination of the variable working angle control executed by control mechanism 10 and the variable phase control executed by control mechanism 20, it is possible to set both the intake valve open timing (IVO) and intake valve closure timing (IVC) of intake valve 1 to a desired IVO and a desired IVC contained within the adjustable area F1 suited to hot engine conditions (the fully warmed-up state). Preprogrammed IVO-IVC adjustable area F1 suited to hot engine operation (hot engine conditions) will be hereinafter referred to as a "hot-engine adjustable area F1". The temperature of working fluid is detected or estimated by a temperature sensing means (not shown). For example, the temperature of working fluid can be sensed directly by means of an oil temperature sensor. In lieu thereof, the temperature of working fluid may be estimated indirectly based on a value of engine temperature (engine coolant temperature) sensed by an engine temperature sensor (a coolant temperature sensor). As can be appreciated from the preprogrammed characteristic maps shown in FIGS. 4 and 5, during the hot engine conditions, the IVO and IVC of intake valve 1 can be effectively changed within the predetermined hot-engine adjustable area F1, thus reducing the pumping loss and improving fuel economy owing to the effectively reduced working angle. FIG. 6 shows the concrete setting of IVO and IVC of intake valve 1, at various engine speed and load conditions, under hot engine conditions. In a very low engine speed and very light load range, it is desirable that the friction loss is reduced by way of the reduced working angle, and additionally the combustion stability (fuel economy) is improved owing to a minus valve overlap. Generally, in the very low engine speed and very light load range (e.g., during idling), there is a tendency that the charging efficiency increases in accordance with a rise in engine load and thus the actual compression ratio increases owing to the engine load rise. For the reasons set forth above, it is desirable to properly advance the intake valve closure timing (IVC) of intake valve 1 depending on the engine load rise. In this case, assuming that the intake valve open timing (IVO) is advanced excessively, properly advancing the intake valve closure timing (IVC), there results in an undesired increase in the valve overlap (that is, an undesired increase in internal EGR). This lowers the combustion stability. Therefore, as shown in FIG. 6, the intake valve open timing suited for the very low engine speed and very light load range, is limited to the timing retarded side in comparison with a low engine speed and light load range.

In a low engine speed and light load range, the combustion velocity tends to increase in comparison with the very low speed and very light load range. Thus, the variably set intake valve closure timing can be expanded in the timing advanced side. In the same manner, limitations on the intake valve open timing are relaxed (see the characteristic curves at 1200 rpm, 1600 rpm, and 2000 rpm in FIG. 6). In the low speed and light load range, the limitations on the intake valve open timing can be further relaxed owing to the engine speed and load both slightly risen as compared to the very low speed and very light load range. Therefore, it is possible to set the intake valve open timing (IVO) to a desired crank angle (corresponding to the timing advanced to a certain extent) after top dead center (TDC). Thus, as compared to a case that the intake valve open timing (IVO) is set to a certain timing nearby TDC, according to the system of the first embodiment shown in FIGS. 4–6, it is possible to increase both the effect of reducing the pumping loss and the effect of reducing the cooling loss owing to the properly increased internal EGR in the low speed and light load range, thereby improving fuel economy. Owing to the enhanced combustion stability in the low speed and light load range, it is possible to use a predetermined, properly-increased valve overlap, thus more effectively improving fuel economy.

In contrast, during cold engine operation (or in a cold-engine state), the temperature of working fluid is low and therefore the coefficient of viscosity is high. When switching the solenoid valve 31 of variable working angle control mechanism 10 between ON and OFF states, or when switching the solenoid valve 41 of variable phase control mechanism 20 between ON and OFF states, in particular when switching the solenoid valve to the OFF state, the high coefficient of viscosity of working fluid prevents the working fluid from being drained quickly and thus prevents the smooth switching operation of the solenoid valve to the OFF state. Due to such a high coefficient of viscosity of working fluid, the response of variable working angle control is deteriorated. Suppose the variable IVC-IVO control suited to hot engine operation as shown in FIG. 6 is made during cold engine operation. In this case, in particular during deceleration during which the engine operating condition is shifted from an operating range that positively uses the valve overlap (abbreviated to O/L) to an engine idling condition of a comparatively low combustion stability, in other words, when the intake valve open timing (IVO) has to be shifted to the timing-retard direction, it is difficult to rapidly shift the IVO to the timing retarded side due to the mechanical response delay arising from the high coefficient of viscosity of working fluid. As a result, the valve overlap cannot be smoothly rapidly reduced. This lowers the combustion stability. Therefore, in the system of the first embodiment, during the cold engine operation, in order to avoid the valve overlap (O/L) from being undesirably increased, as can be seen from the characteristic map of FIG. 5, an IVC-IVO adjustable area G1 suited to cold engine operation (which will be hereinafter referred to as a "cold-engine adjustable area G1") is provided. Cold-engine adjustable area G1 is limited largely as compared to predetermined hot-engine adjustable area F1, so that at least the IVO of intake valve 1 is retarded in comparison with a predetermined stability-limit intake valve open timing α1 due to the residual gas. In other words, the maximum advanced intake valve open timing IVO is limited to predetermined stability-limit intake valve open timing α1 during the cold engine operation. Owing to the properly limited cold-engine adjustable area G1, the valve overlap (O/L) of cold-engine operation can be kept below a predetermined valve overlap period. Even during the cold engine operation during which the switching operation of variable working angle control mechanism 10 tends to retard due to the high coefficient of viscosity of working fluid, there is no risk of lowering the combustibility, because of properly controlled valve overlap. Concretely, during the cold engine operation, the variable phase control is stopped, that is, phase control actuator 40 is shifted to the inoperative state. Thus, the variable phase control mechanism 20 is held at predetermined maximum retarded phase L2. During the cold engine operation, the IVC-IVO adjustable area is limited to predetermined cold-engine adjustable area G1, and thus there is no possibility that the intake valve open timing (IVO) further advances from stability-limit intake valve open timing α1. That is, the working angle of intake valve 1 can be properly variably controlled within predetermined cold-engine adjustable area G1 depending upon the engine operating conditions, by means of variable working angle control mechanism 10. In this manner, during the cold engine operation the IVC and IVO of intake valve 1 are variably controlled in accordance with the IVC-IVO characteristic different from that used during the hot engine operation, and therefore it is possible to create or produce a sufficient engine output torque even in the presence of increased torque demands. As discussed above, the system of the first embodiment can avoid the valve overlap from being undesirably increased and prevent the combustion stability from being lowered, thus ensuring the enhanced acceleration performance even during the cold engine operation. In addition to the above, in the initial state P1 that the engine is stopped, variable phase control mechanism 20 is designed to be held at its maximum retarded phase L2. Therefore, during cold-start operation, there is no need of switching variable phase control mechanism 20 to the maximum retarded phase L2. This enhances the combustion stability during the engine cold start.

Figure 7:
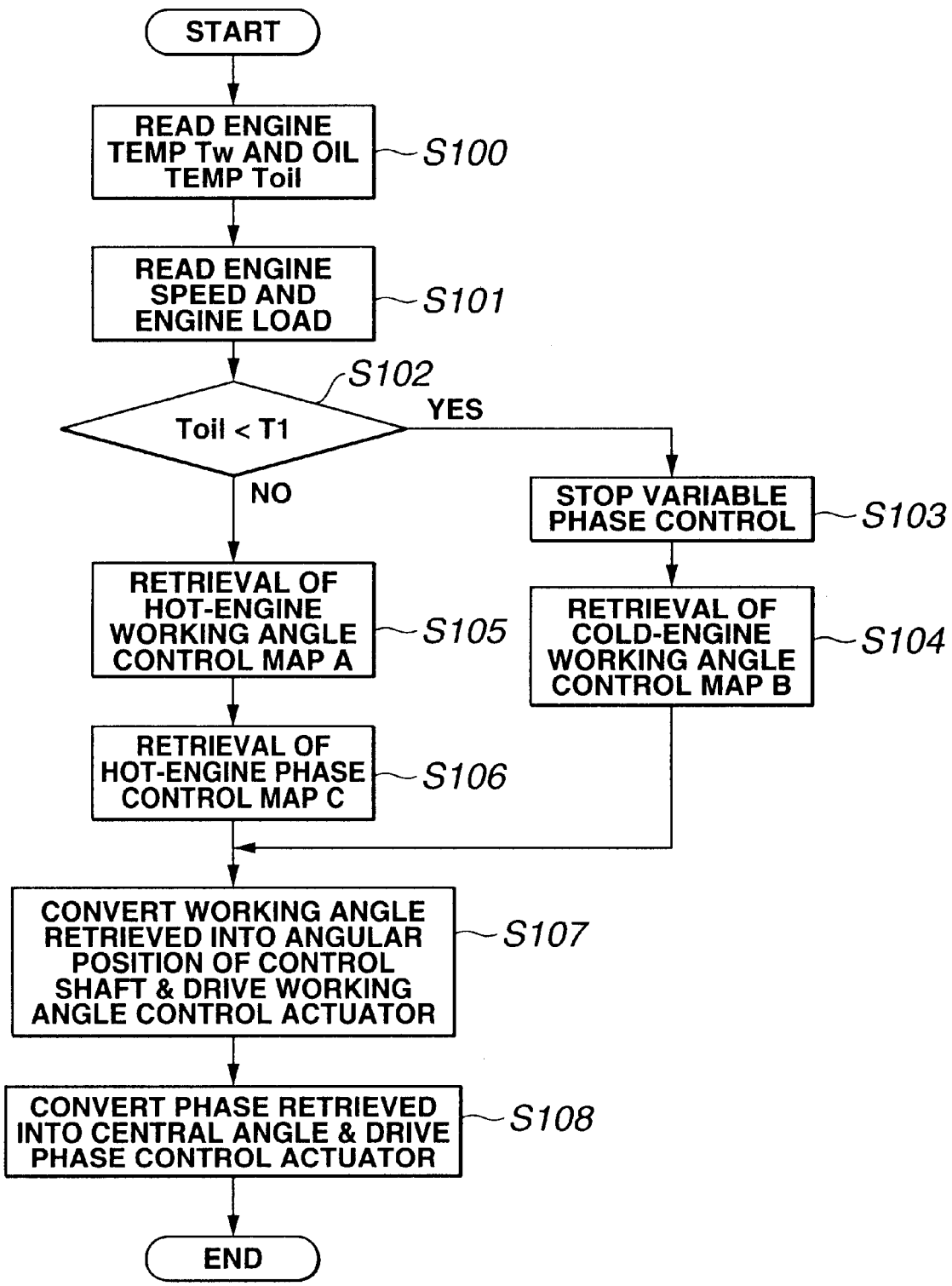
FIG. 7 is a flow chart illustrating a control routine executed by the variable working angle and phase control system of the first embodiment.
Figure 9:
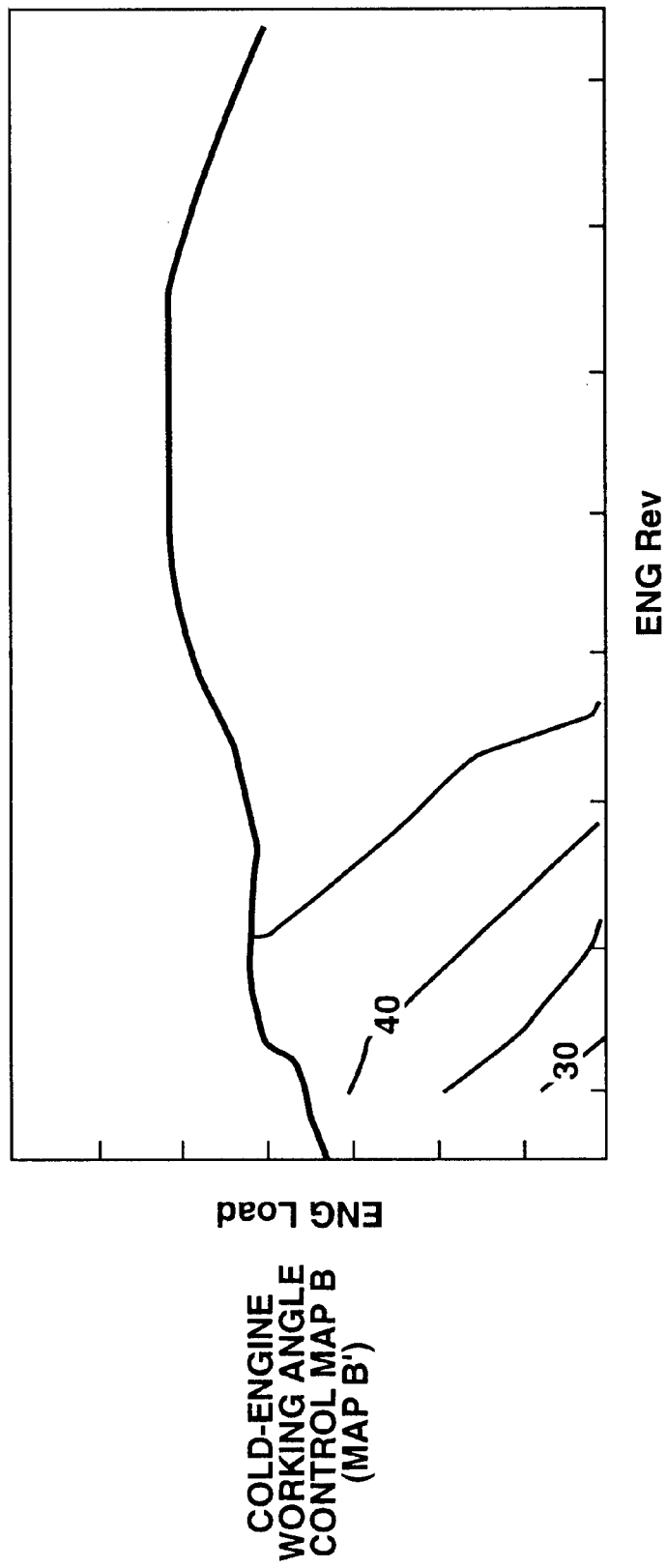
FIG. 9 is a preprogrammed working angle control map (MAP B or MAP B') for cold engine operation, stored in the memories of the electronic control unit incorporated in the variable working angle and phase control system of the first embodiment.

Referring now to FIG. 7, there is shown the variable working angle and phase control routine executed by ECU 50 incorporated in the variable working angle and phase control system of the first embodiment.

At step S100, the engine coolant temperature Tw (regarded as the actual engine operating temperature) and the oil temperature Toil of working fluid are read. At step S101, the engine speed and the engine load are read. At step S102, a check is made to determine whether the oil temperature Toil of working fluid is less than a predetermined reference oil temperature T1. When the oil temperature Toil is less than the reference temperature value T1, that is, Toil<T1, the ECU determines that the engine is cold. Conversely when the oil temperature Toil is greater than or equal to the reference temperature value T1, that is, Toil≧T1, the ECU determines that the engine is hot. That is, step S102 determines or discriminates, responsively to the oil temperature Toil detected, that the engine is conditioned in one of the cold-engine state and the hot-engine state. In order to determine whether the engine is cold or hot, instead of using a comparison between the oil temperature Toil and its reference temperature value T1, the determination may be based on a comparison between the engine coolant temperature Tw and its predetermined reference temperature value. When the answer to step S102 is in the affirmative (YES), that is, Toil<T1 (during cold engine operation), the routine proceeds to step S103. At step S103, the variable phase control is stopped, and thus variable phase control mechanism 20 is shifted to and kept at its set position (i.e., the maximum retarded phase L2). Thereafter, at step S104, a desired working angle suited to the cold engine condition is computed or map-retrieved from the preprogrammed cold-engine working angle control map B (see FIG. 9) showing how the desired working angle has to be varied relative to the engine speed and engine load during the cold engine operation. After step S104, the routine proceeds to step S107. Returning to step S102, when the answer to step S102 is in the negative (NO), that is, Toil≧T1 (during hot engine operation), the routine proceeds from step S102 to step S105. At step S105, a desired working angle suited to the hot engine condition is computed or map-retrieved from the preprogrammed hot-engine working angle control map A (see FIG. 8A) showing how the desired working angle has to be varied relative to the engine speed and engine load during the hot engine operation. Subsequently to step S105, step S106 occurs. At step S106, a desired phase suited to the hot engine condition is computed or map-retrieved from the preprogrammed hot-engine phase control map C (see FIG. 8B) showing how the desired phase has to be varied relative to the engine speed and engine load during the hot engine operation. After this, at step S107, the working angle retrieved from the preprogrammed maps A or B is converted into the angular position of control shaft 13. Responsively to the duty cycle of the pulsewidth modulated signal corresponding to the determined angular position of control shaft 13, variable working angle control mechanism 10 is driven. Thereafter, at step S108, the phase retrieved from the preprogrammed map C suited to the hot engine operation (see step S106) is converted into the central angle of working angle. During the hot engine operation, control actuator 40 of variable phase control mechanism 20 is driven responsively to the duty cycle of the pulsewidth modulated signal corresponding to the central angle determined through the conversion process. In contrast, during the cold engine operation, variable phase control mechanism 20 is held at the initial set position corresponding to the maximum retarded phase L2 (see step S103).

Figure 10:
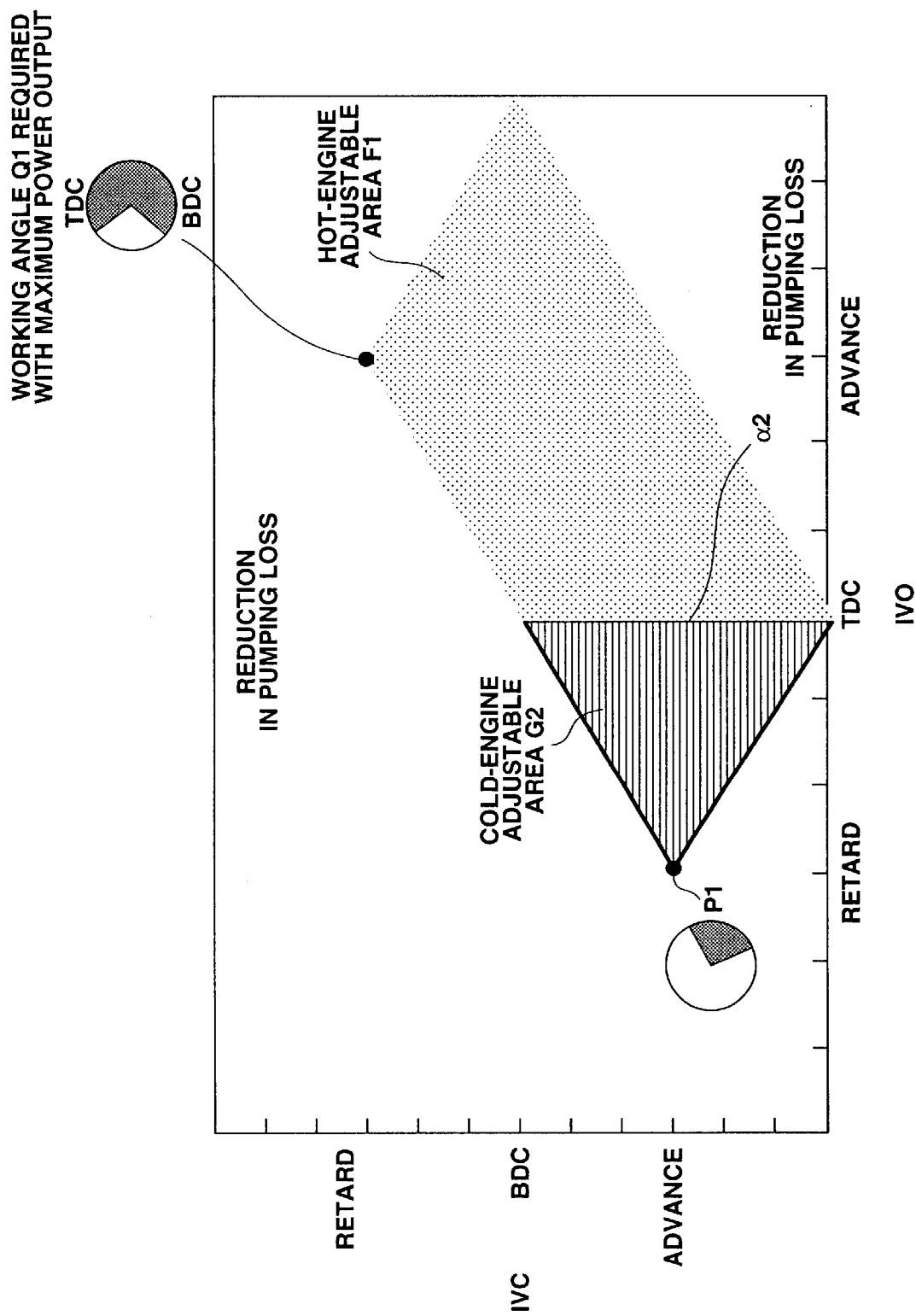
FIG. 10 is a predetermined IVO-IVC characteristic map which is used within a variable working angle and phase control system of a second embodiment of the present invention, and shows a left-hand side adjustable area G2 for cold engine operation.
Figure 13:
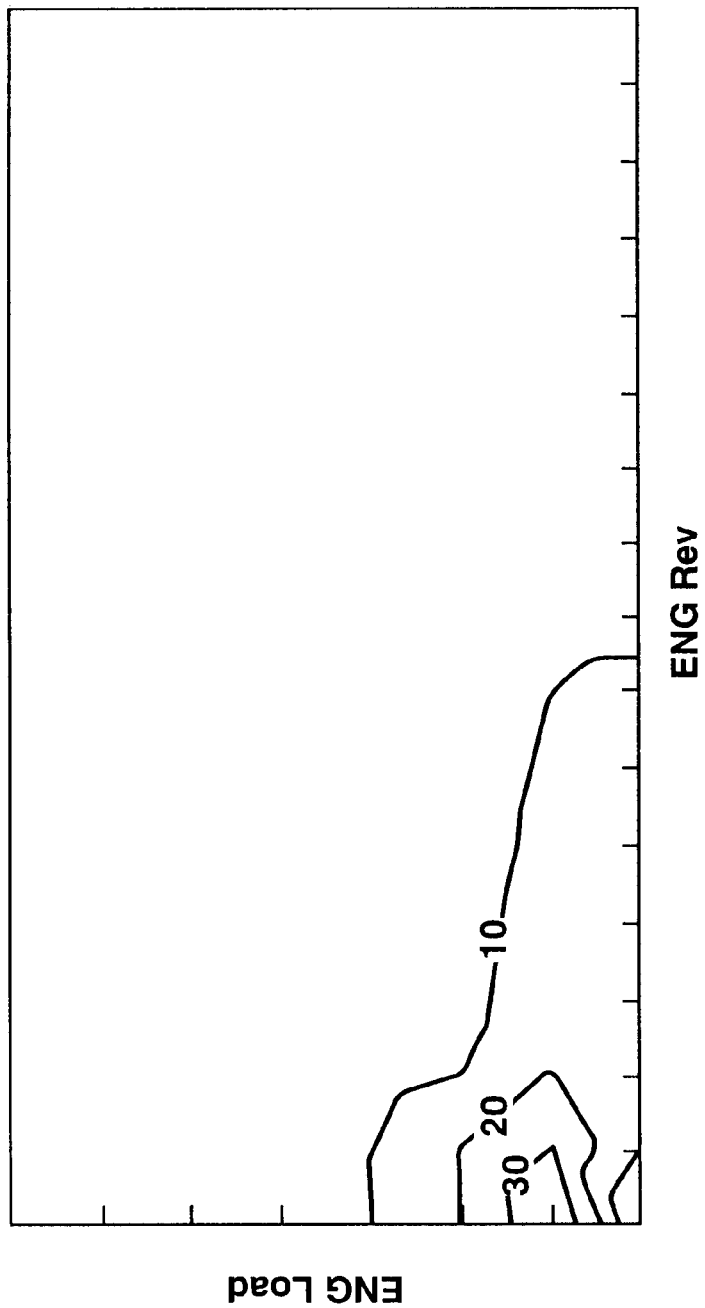
FIG. 13 is a preprogrammed phase control map (MAP D') for cold engine operation, stored in the memories of the electronic control unit incorporated in each of the variable working angle and phase control systems of the second and third embodiments.

Referring now to FIG. 10, there is shown the preprogrammed characteristic map used in the variable working angle and phase control system of the second embodiment. The system of the second embodiment (relating to FIGS. 9–10 and 13) is somewhat different from that of the first embodiment (relating to FIGS. 4–7, 8A, 8B, and 9) in the variable phase control during the cold engine operation. As described previously, in the system of the first embodiment, variable phase control mechanism 20 is held at the initial set position (maximum retarded phase L2) during cold engine operation. On the other hand, in the system of the second embodiment, the IVC-IVO adjustable area suited to the cold engine operation is limited to the preprogrammed cold-engine adjustable area G2, and thus the phase (i.e., the angular phase at the central angle of working angle) as well as the working angle of intake valve 1 can be varied within predetermined cold-engine adjustable area G2 during the cold engine operation. This more effectively enhances engine power output and improves fuel economy. To be concrete, preprogrammed cold-engine adjustable area G2 (see the left-hand side substantially equilateral triangular hatched space of FIG. 10) is limited remarkably as compared to predetermined hot-engine adjustable area F1, so that the intake valve open timing IVO is retarded in comparison with a predetermined stability-limit intake valve open timing α2 which is set nearby TDC. In other words, the maximum advanced intake valve open timing IVO is limited to predetermined stability-limit intake valve open timing α2 during the cold engine operation. Thus, in the same manner as the first embodiment, the system of the second embodiment can avoid the valve overlap from being undesirably increased and prevent the combustion stability from being lowered even during the cold engine operation.

Figure 11:
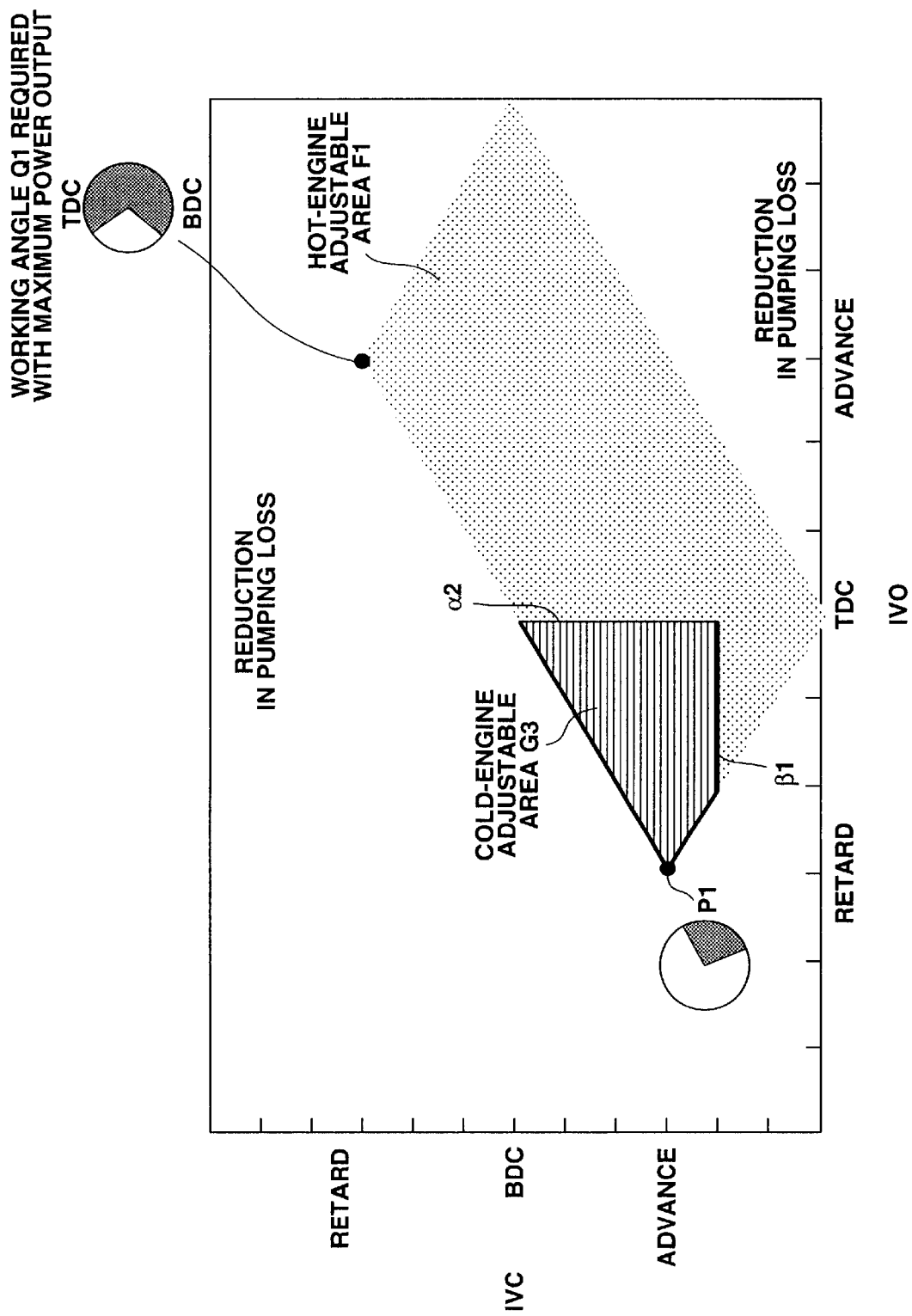
FIG. 11 is a predetermined IVO-IVC characteristic map which is used within a variable working angle and phase control system of a third embodiment of the present invention, and shows a left-hand side adjustable area G3 for cold engine operation.

Referring now to FIG. 11, there is shown the preprogrammed characteristic map used in the variable working angle and phase control system of the third embodiment. The system of the third embodiment (relating to FIGS. 9, and 11–13) is basically similar to that of the second embodiment (relating to FIGS. 9–10 and 13). The system of the third embodiment is different from that of the second embodiment in that a predetermined stability-limit intake valve closure timing $\beta 1$ is provided in addition to predetermined stability-limit intake valve open timing $\alpha 2$ so as to accurately manage the actual compression ratio and thus to ensure the more enhanced combustion stability. That is to say, the preprogrammed cold-engine adjustable area G3 suited to cold engine operation (see the left-hand substantially reversed kite-shaped hatched space of FIG. 11) is limited highly as compared to predetermined hot-engine adjustable area F1, so that the intake valve open timing IVO is retarded in comparison with predetermined stability-limit intake valve open timing $\alpha 2$ set nearby TDC and the intake valve closure timing IVC is retarded in comparison with predetermined stability-limit intake valve closure timing $\beta 1$. In other words, during the cold engine operation, the maximum advanced intake valve open timing IVO is limited to predetermined stability-limit intake valve open timing $\alpha 2$, whereas the maximum advanced intake valve closure timing IVC is limited to predetermined stability-limit intake valve closure timing $\beta 1$. In the shown embodiment, predetermined stability-limit intake valve closure timing $\beta 1$ is set such that, in the presence of higher engine load requirement with the small working angle, the intake valve closure timing IVC is prevented from advancing excessively while satisfying the load requirement. As shown in FIG. 11, it is preferable to set predetermined stability-limit intake valve closure timing $\beta 1$ to a valve closure timing advanced considerably as compared to bottom dead center (BDC).

Figure 12:
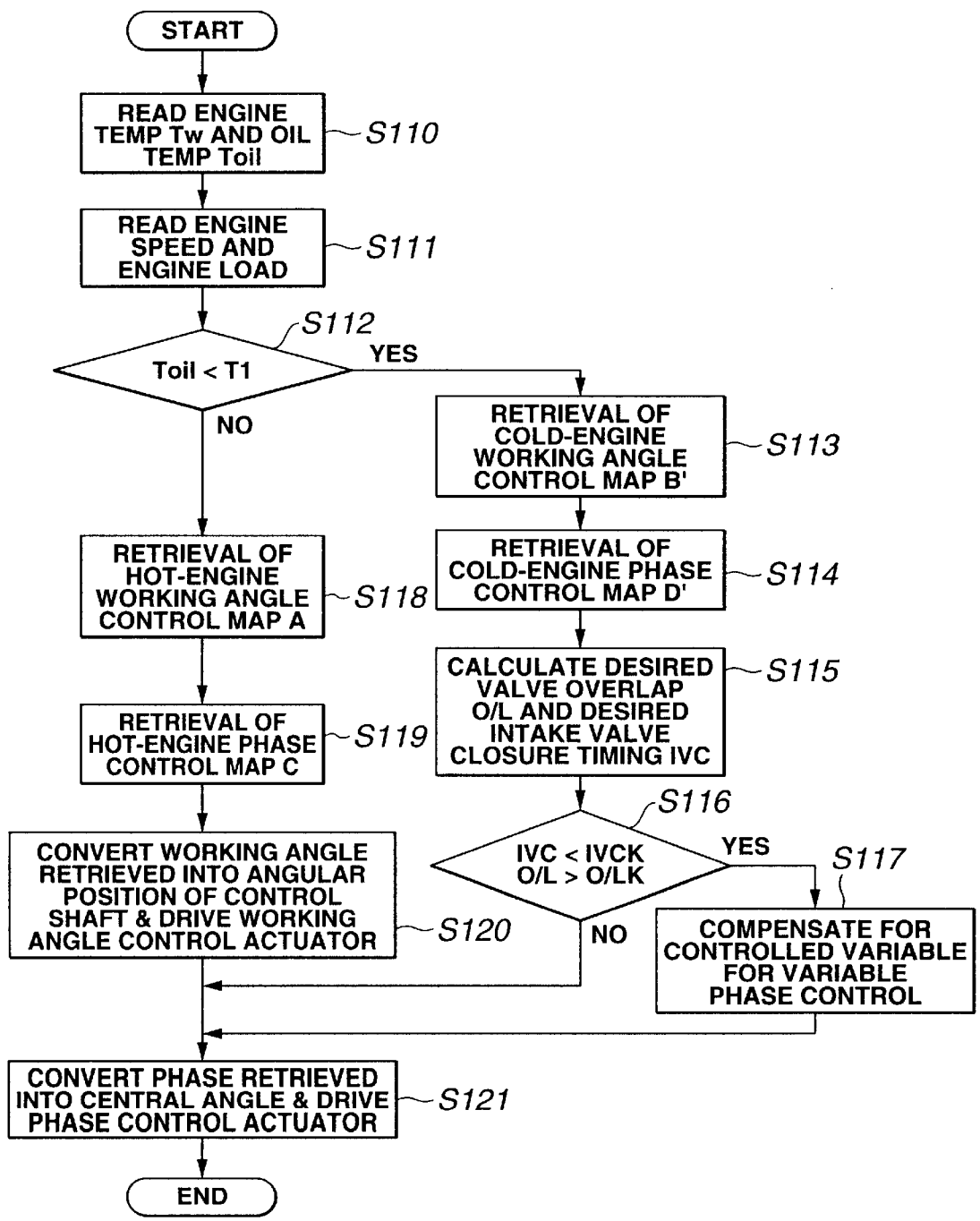
FIG. 12 is a flow chart illustrating a control routine executed by each of the variable working angle and phase control systems of the second and third embodiments.

Referring now to FIG. 12, there is shown the variable working angle and phase control routine of the variable working angle and phase control system of the third embodiment. The routine of FIG. 12 is similar to the routine of FIG. 7. Steps S110–S112 and S118–S121 of the third embodiment shown in FIG. 12 are identical to steps S100–S102 and S105–S108 of the first embodiment shown in FIG. 7. S103 and S104 included in the routine of the first embodiment shown in FIG. 7 are replaced with steps S113–S117 included in the routine of the third embodiment shown in FIG. 12. Steps S113–S117 will be hereinafter described in detail with reference to the accompanying drawings, while detailed description of steps S110–S112 and S118–S121 will be omitted because the above description thereon seems to be self-explanatory.

At step S112, when the condition defined by the inequality Toil<T1 is satisfied and therefore the ECU determines that the engine is cold, the routine proceeds to step S113. At step S113, a desired working angle suited to the cold engine condition is computed or map-retrieved from the preprogrammed cold-engine working angle control map B' (see FIG. 9) showing how the desired working angle has to be varied relative to the engine speed and engine load during the cold engine operation. Thereafter, at step S114, a desired phase suited to the cold engine condition is computed or map-retrieved from the preprogrammed cold-engine phase control map D' (see FIG. 13) showing how the desired phase has to be varied relative to the engine speed and engine load during the cold engine operation. At step S115, a desired valve overlap O/L and a desired intake valve closure timing IVC are computed or arithmetically calculated on the basis of both the desired working angle set at step S113 and the desired phase set at step S114. Thereafter, at step S116, a first check is made to determine whether the desired valve overlap O/L is greater than a predetermined decision criterion O/LK (i.e., O/L>O/LK), in other words, whether the IVO is undesirably advanced in comparison with predetermined stability-limit intake valve open timing $\alpha 2$. At the same time, at step S116, a second check is made to determine whether the desired intake valve closure timing IVC is less than a predetermined threshold value IVCK (i.e., IVC<IVCK), that is, whether the IVC is undesirably advanced in comparison with predetermined stability-limit intake valve closure timing $\beta 1$. When at least one of the condition defined by IVC<IVCK and the condition defined by O/L>O/LK is satisfied, the routine flows from step S116 to step S117. At step S117, for example by compensating for the controlled variable of variable phase control performed by variable phase control mechanism 20, the desired intake valve open timing IVO and desired intake valve closure timing IVC of intake valve 1 are reset so that the IVO and IVC exist within preprogrammed cold-engine adjustable area G3 shown in FIG. 11. After step S117, the routine proceeds to step S121. When the answer to step S116 is negative (NO) and thus the previously-noted two conditions defined by IVC<IVCK and O/L>O/LK are unsatisfied simultaneously, the ECU determines that it is unnecessary to compensate for controlled variables of variable phase control and/or variable working angle control. At this time, the routine flows from step S116 to step S121. At step S121, the phase retrieved through steps S114 or S119 or compensated through step S117 is converted into the central angle of working angle. During the hot engine operation, control actuator 40 of variable phase control mechanism 20 is driven responsively to the duty cycle of the pulsewidth modulated signal corresponding to the central angle based on the phase map-retrieved through step S119. In contrast, during the cold engine operation, control actuator 40 of variable phase control mechanism 20 is driven responsively to the duty cycle of the pulsewidth modulated signal corresponding to the central angle based on the phase map-retrieved through step S114 or the phase compensated through step S117. In the routine corresponding to the system of the second embodiment (relating to FIGS. 9–10 and 13), computation for desired intake valve closure timing IVC (executed at step S115) and a comparison between two values IVC and IVCK (executed at step S116) are omitted.

As generally known, the combustion stability is greatly influenced by an ignitability. An in-cylinder temperature, an in-cylinder pressure, an air/fuel mixture ratio (often abbreviated to "A/F"), and the like function as the controlling factor in the ignitability. As a matter of course, the in-cylinder temperature obtained when the engine is hot and spark plug firing is initiated, is remarkably different from that obtained when the engine is cold and spark plug firing is initiated. Likewise, the fuel volatility (i.e., a desired value of A/F) obtained during the hot engine condition, is greatly different from that obtained during the cold engine condition. Also, at light load conditions, the in-cylinder pressure is low. By considering these factors, it is possible to effectively improve fuel economy depending upon the engine load and the engine temperature (depending on whether the engine is hot or cold), while enhancing the combustion stability. In the shown embodiment, the previously-noted preprogrammed control maps for the desired phase and the desired working angle are determined by considering these factors.

Figure 14:
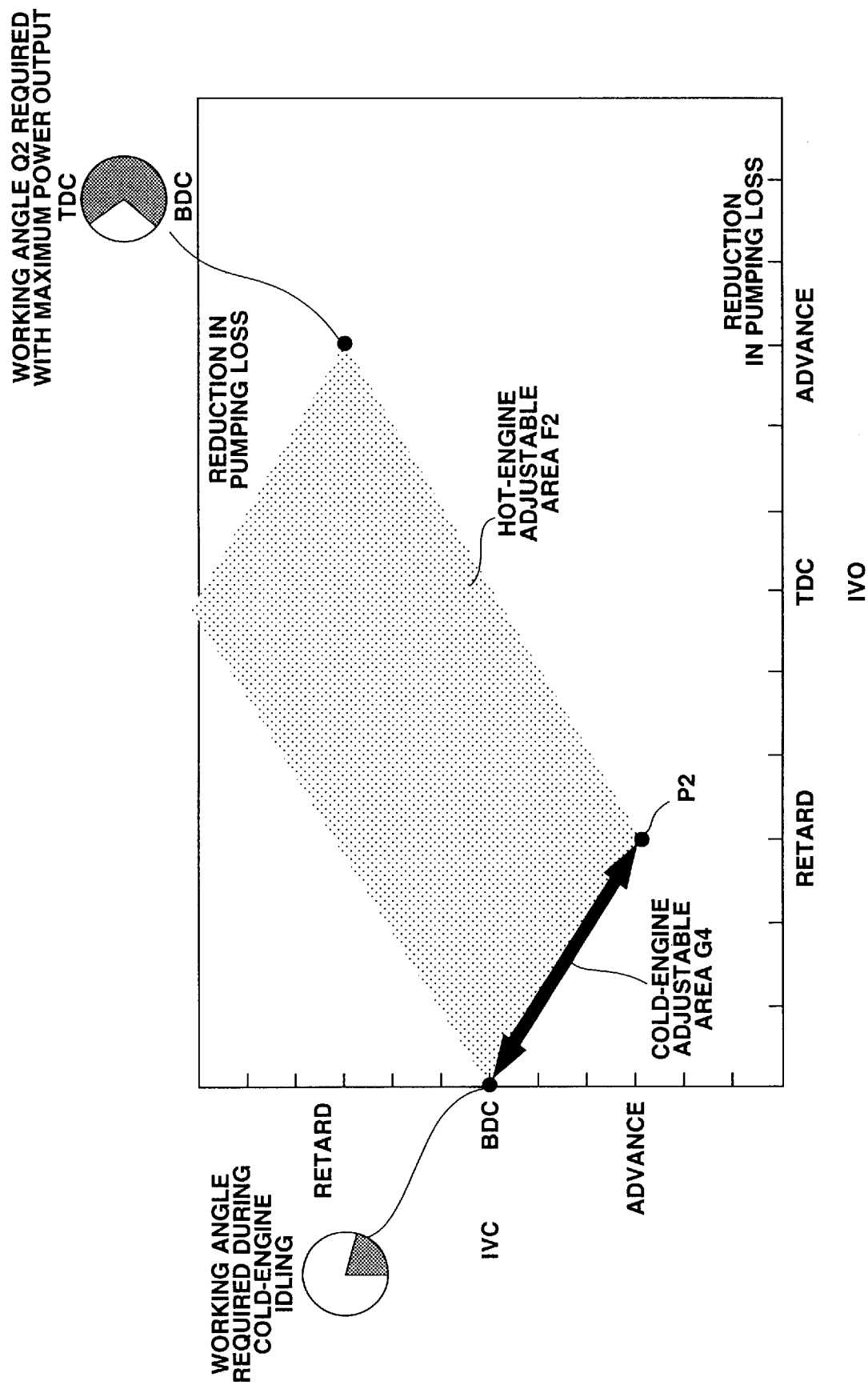
FIG. 14 is a predetermined IVO-IVC characteristic map which is used within a variable working angle and phase control system of a fourth embodiment of the present invention, and shows a left-hand side adjustable area G4 suitable for cold engine operation, the area G4 being excessively limited in comparison with the adjustable area F2 suitable for hot engine operation and indicated by a hatched parallelogram area.
Figure 15:
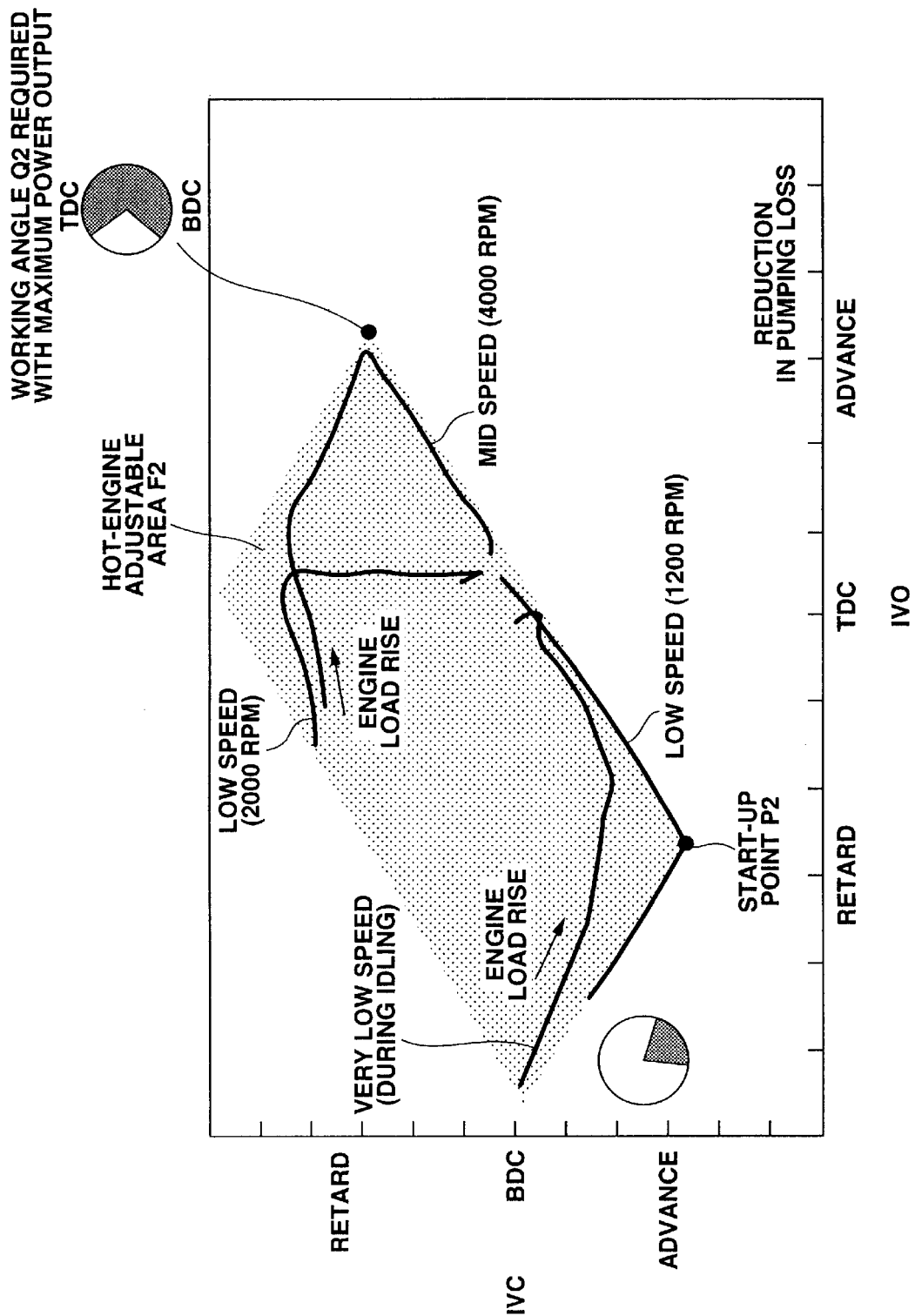
FIG. 15 is a characteristic map showing variations of the intake valve open timing (IVO) and intake valve closure timing (IVC) during the hot engine operation, on the predetermined IVO-IVC adjustable area characteristic map of FIG. 14.
Figure 16:
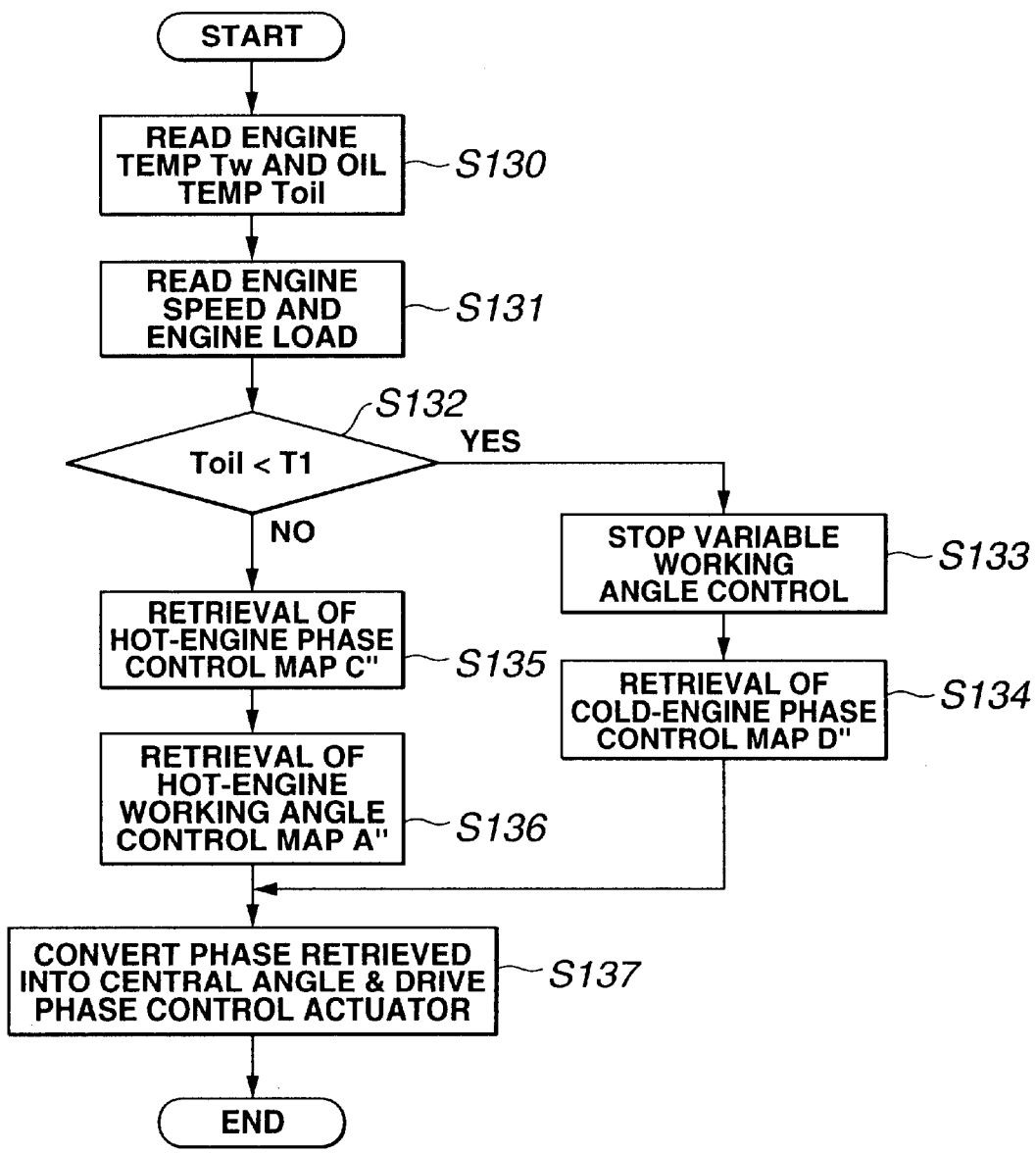
FIG. 16 is a flow chart illustrating a control routine executed by the variable working angle and phase control system of the fourth embodiment.
Figure 18:
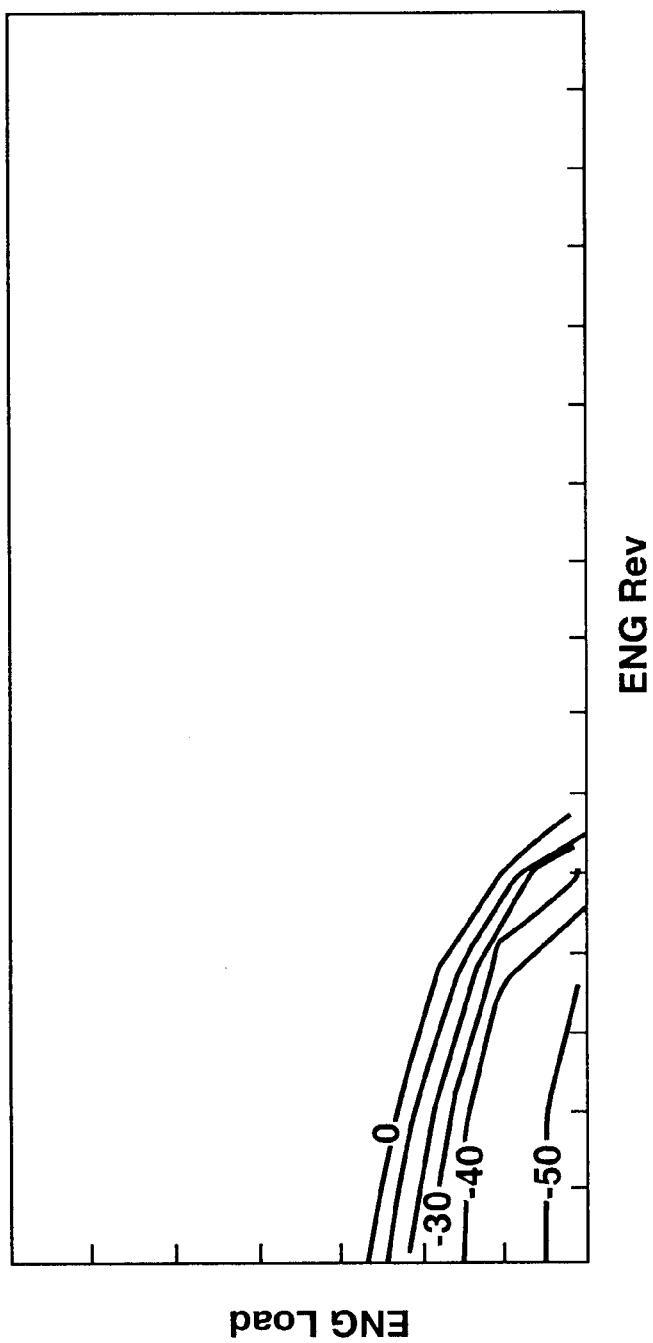
FIG. 18 is a preprogrammed phase control map (MAP D") for cold engine operation, stored in the memories of the electronic control unit incorporated in the variable working angle and phase control systems of the fourth embodiment.

Referring now to FIGS. 14 and 15, there is shown the preprogrammed characteristic map used in the variable working angle and phase control system of the fourth embodiment. FIG. 4 shows an example of the predetermined IVO-IVC adjustable area characteristic map used in the variable working angle/phase control system of the fourth embodiment. The hatched parallelogram area of FIGS. 14 and 15 corresponds to the preprogrammed IVO-IVC adjustable area F2 within which both of the IVO and IVC of intake valve 1 can be variably controlled or adjusted during hot engine conditions. Preprogrammed adjustable area F2 will be hereinafter referred to as a "preprogrammed hot-engine adjustable area F2". Circle graphs of FIGS. 14 and 15 schematically indicate the IVO and IVC of intake valve 1 at various states of variable working angle/phase control, for example, during cold-engine idling, a maximum output state Q2, and the like. In the variable working angle and phase control system of the fourth embodiment, in an initial state P2 in which working angle control actuator 30 and phase control actuator 40 are inoperative for example when the engine is stopped and thus the output signals from ECU are not being sent to solenoid valves 31 and 41, variable working angle control mechanism 10 is kept at its initial position that corresponds to a predetermined minimum working angle, and simultaneously variable phase control mechanism 20 is kept at its set position that corresponds to a predetermined maximum advanced phase. The IVC and IVO of intake valve 1 can be both changed or retarded from the predetermined maximum advanced phase (corresponding to the initial set position P2) towards the desired phase determined based on the duty cycle of the pulsewidth modulated signal from ECU 50, by driving variable phase control mechanism 20. In the system of the fourth embodiment, note that the IVC-IVO adjustable area suited to the cold engine operation is limited to the preprogrammed cold-engine adjustable area G4. The previously-noted hot-engine adjustable area F2 containing the initial state P2 and used in the system of the fourth embodiment (relating to FIGS. 14–18) is set or determined based on various factors, namely, an idling state after engine warm-up, a working angle characteristic of working angle Q2 required with maximum power output, an operable area that satisfies an allowable combustion stability under a particular condition wherein variable working angle control mechanism 10 is inoperative and is kept at the initial set position corresponding to the predetermined minimum working angle, and the like. The minimum working angle of intake valve 1 also reduces a valve lift. As can be appreciated from a comparison of the parallelogram areas of FIGS. 4 and 14, as a whole, preprogrammed hot-engine adjustable area F2 of the fourth embodiment is shifted to the timing-retarded side in comparison with preprogrammed hot-engine adjustable area F1 of the first, second, and third embodiments. As shown in FIG. 14, when the phase is retarded from the initial state P2 (the uncontrolled state of actuators 30 and 40) by driving variable phase control mechanism 20, the intake valve open timing IVO is further retarded, thereby increasing the in-cylinder negative pressure. As a result, the flow velocity of intake air entering the cylinder becomes high and thus fuel atomization can be promoted. At this time, the pumping loss tends to increase and therefore the weight of intake air entering the cylinder tends to increase. This contributes to the enhanced combustion stability. As can be appreciated from the limited cold-engine adjustable area G4 of FIG. 14, the system of the fourth embodiment can remarkably enhance the catalyst temperature rise characteristic at cold engine conditions. To be concrete, in the system of the fourth embodiment, during the cold engine operation, variable working angle control mechanism 10 is held at the minimum working angle, while variable phase control mechanism 20 is variably controlled within the preprogrammed cold-engine adjustable area G4 ranging from the maximum retarded phase and to the maximum advanced phase. As discussed above, as a whole, preprogrammed hot-engine adjustable area F2 itself is preset in the timing-retardation side, and thus the intake valve open timing IVO can be set at a timing retarded sufficiently from predetermined stability-limit intake valve open timing $\alpha 1$ (or predetermined stability-limit intake valve open timing $\alpha 2$), even when the phase of intake valve 1 is changed from the maximum retarded phase to the maximum advanced phase by means of variable phase control mechanism 20 with variable working angle control mechanism held at the initial set position corresponding to the minimum working angle. The system of the fourth embodiment can avoid the valve overlap from being undesirably increased, thus improving the combustion stability during the cold engine operation. As can be seen from preprogrammed cold-engine adjustable range G4, the system of the fourth embodiment uses all of the phase control area given for variable phase control mechanism 20 even during the cold engine conditions. This enhances the degree of freedom in variable phase control. FIG. 15 shows the concrete setting of IVO and IVC of intake valve 1, at various engine speed and load conditions, such as in a very low speed and very light load range (during idling), in a low speed (at 1200 rpm) and light load range, in a low speed (at 2000 rpm) and light load range, and in a mid speed (at 4000 rpm) and mid load range. As discussed above, in the initial state or uncontrolled state P2 (such as at engine startup point) in which the engine is still stopped and thus control actuators 30 and 40 are inoperative, variable working angle control mechanism 10 is kept at the initial position corresponding to the minimum working angle, while variable phase control mechanism 20 is kept at the initial position corresponding to the maximum advanced phase. When the engine is started from the initial state P2, variable phase control mechanism 20 is driven toward the maximum retarded phase with a rise in hydraulic pressure. The control procedure executed by ECU 50 thereafter is hereunder described with reference to the flow chart shown in FIG. 16.

At step S130, the engine coolant temperature Tw and the oil temperature Toil of working fluid are read. At step S131, the engine speed and the engine load are read. At step S132, a check is made to determine whether the oil temperature Toil is less than a predetermined reference temperature T1. When Toil<T1, the ECU determines that the engine is cold. Conversely when Toil≧T1, the ECU determines that the engine is hot. When the answer to step S132 is affirmative, that is, Toil<T1 (during cold engine operation), the routine proceeds to step S133. At step S133, the variable working angle control is stopped, and thus variable working angle control mechanism 10 is shifted to and kept at its set position (i.e., the minimum working angle). Thereafter, at step S134, a desired phase suited to the cold engine condition is computed or map-retrieved from the preprogrammed cold-engine phase control map D" (see FIG. 18) showing how the desired phase has to be varied relative to the engine speed and engine load during the cold engine operation. After step S134, the routine proceeds to step S137. What the system of the fourth embodiment is aiming at is shortening the catalyst temperature rising time period during the cold engine operation and reducing unburned hydrocarbons owing to retardation of the ignition timing. Therefore, it is preferable to set the valve overlap O/L to a negative value as mush as possible. That is, in order to for the catalyst temperature to rise rapidly, the working angle/phase control is programmed or designed to efficiently rise the in-cylinder temperature by properly retarding the intake valve open timing IVO. As can be seen from the change in each of characteristic curves (at an idling speed, at 200 rpm, and at 4000 rpm) of FIG. 15, according to the increase in engine load, the controlled variable of variable phase control actuator 40 is adjusted to zero, so as to realize an increase in engine output torque. Returning to step S132, when the answer to step S132 is negative (NO), that is, Toil≧T1 (during hot engine operation), the routine proceeds from step S132 to step S135. At step S135, a desired phase suited to the hot engine condition is computed or map-retrieved from the preprogrammed hot-engine phase control map C" (see FIG. 17B) showing how the desired phase has to be varied relative to the engine speed and engine load during the hot engine operation. After execution of step S135, step S106 occurs. At step S136, a desired working angle suited to the hot engine condition is computed or map-retrieved from the preprogrammed hot-engine working angle control map A" (see FIG. 17A) showing how the desired working angle has to be varied relative to the engine speed and engine load during the hot engine operation. After this, at step S137, the phase retrieved from the preprogrammed map C" suited to the hot engine operation (see step S135) or retrieved from the preprogrammed map D" suited to the cold engine operation (see step S134) is converted into the central angle of working angle. Control actuator 40 of variable phase control mechanism 20 is driven responsively to the duty cycle of the pulsewidth modulated signal corresponding to the central angle determined through the conversion process. During the hot engine operation, the working angle retrieved from the preprogrammed map A" of step S136 is converted into the angular position of control shaft 13. Responsively to the duty cycle of the pulsewidth modulated signal corresponding to the determined angular position of control shaft 13, variable working angle control mechanism 10 is driven. In contrast, during the cold engine operation, variable working angle control mechanism 10 is held at the initial set position corresponding to the minimum working angle (see step S133). According to the system of the fourth embodiment, in the same manner as the system of each of the first, second, and third embodiments, it is possible to reliably avoid the engine combustion stability from being lowered particularly during cold engine conditions. In addition, in the fourth embodiment, it is possible to highly reconcile the enhanced catalyst temperature rise characteristic with the enhanced acceleration performance. During cold-engine starting, there are various problems, namely increased unburned hydrocarbons, insufficient amount of working fluid for the hydraulically-operated actuators 30 and 40, and high coefficient of viscosity of working fluid. In the system of the fourth embodiment, during the cold engine operation, one (i.e., working angle control actuator) of two control actuators 30 and 40 is held in the inoperative state. The limited amount of working fluid can be efficiently used for phase control actuator 40. The design discharge of working fluid discharged from oil pump 9 can be reduced, and thus the size of oil pump can be downsized. Additionally, in the initial state P2 that the engine is stopped, variable working angle control mechanism 10 is designed to be held at its minimum working angle. Therefore, during cold-start operation, there is no need of resetting or switching variable working angle control mechanism 10 to the minimum working angle. This enhances the combustion stability during the engine cold start. Moreover, as can be appreciated from a comparison between the routine executed by the system of the fourth embodiment shown in FIG. 16 (or the routine executed by the system of the first embodiment shown in FIG. 7) and the routine executed by the system of the third embodiment shown in FIG. 12, the control routines (or control programs) of the systems of the first and fourth embodiments are simplified in comparison with that of the third embodiment.

Figure 19:
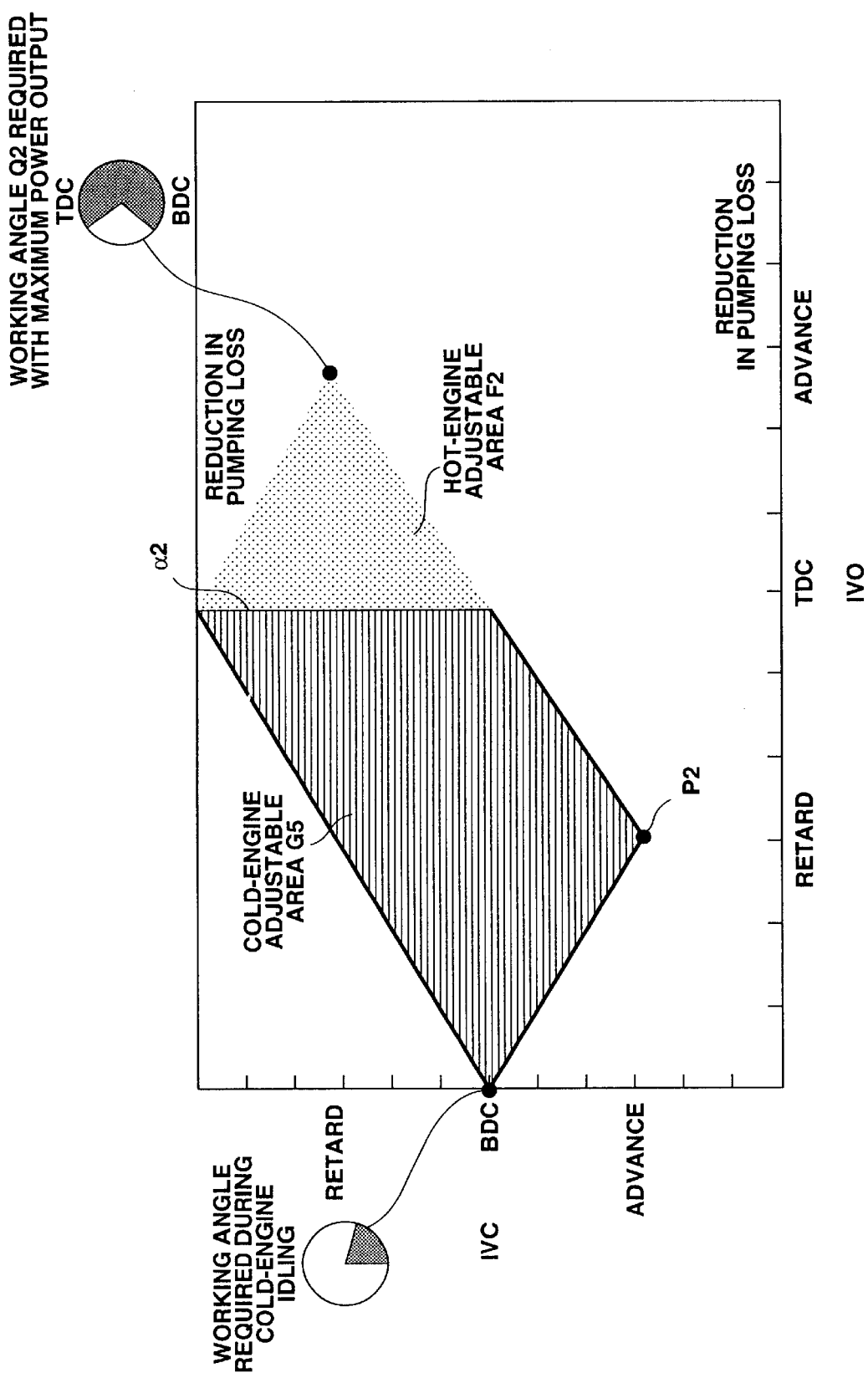
FIG. 19 is a predetermined IVO-IVC characteristic map which is used within a variable working angle and phase control system of a fifth embodiment of the present invention and shows a left-hand side adjustable area G5 suitable for cold engine operation, the area G5 being limited in comparison with the adjustable area F2 suitable for hot engine operation and indicated by a hatched parallelogram area.

Referring now to FIG. 19, there is shown the preprogrammed characteristic map used in the variable working angle and phase control system of the fifth embodiment. As compared to the system of the fourth embodiment (relating to FIGS. 14–18), the system of the fifth embodiment of FIG. 19 is designed to further improve fuel economy by positively driving variable working angle control mechanism 10 during the cold engine operation. To be concrete, in order to prevent for the valve overlap O/L to be lowered more excessively than need be when switching the solenoid valve to the OFF state, the system of the fifth embodiment is designed or programmed to retard, during the cold engine operation, the intake valve open timing IVO in comparison with the predetermined stability-limit intake valve open timing $\alpha 2$ which is set nearby TDC. That is, in the same manner as the fourth embodiment, in the system of the fourth embodiment preprogrammed hot-engine adjustable area F2 is shifted to the timing-retarded side in comparison with preprogrammed hot-engine adjustable area F1. The IVC-IVO adjustable area suited to the cold engine operation of the system of the fifth embodiment is limited to the preprogrammed cold-engine adjustable area G5, and additionally this cold-engine adjustable area G5 is comparatively widely ranged as can be appreciated from the left-hand side trapezoidal hatched space of FIG. 19. Therefore, the phase (i.e., the angular phase at the central angle of working angle) as well as the working angle of intake valve 1 can be varied within comparatively wide cold-engine adjustable area G5 during the cold engine operation. In other words, the working angle control and the phase control can be both executed within the comparatively wide control area G5 during the cold engine operation. The system of the fifth embodiment is superior to that of the fourth embodiment, in the degree of freedom of the variable working angle and phase control executed during the cold engine conditions.

Referring now to FIG. 20, there is shown the preprogrammed characteristic map used in the variable working angle and phase control system of the sixth embodiment. As may be appreciated from comparison between a comparison of the parallelogram areas of FIGS. 19 and 20, a preprogrammed hot-engine adjustable area F3 of the sixth embodiment of FIG. 20, in particular the working angle adjustable width or area of variable working angle control mechanism 10 is further extended or expanded from preprogrammed hot-engine adjustable area F2 of the fifth embodiment towards the minimum working angle side. Owing to the further extended preprogrammed hot-engine adjustable. area F3, if the variable working angle control is made in the same manner as the system of the fifth embodiment, there in an increased tendency for the intake valve closure timing IVC to advance more excessively than need be when variably controlling the working angle towards the very small working angle. This undesirably lowers the actual compression ratio, thus deteriorating the combustion stability. To avoid this, in the system of the sixth embodiment, a predetermined stability-limit intake valve closure timing $\beta 2$ as well as predetermined stability-limit intake valve open timing $\alpha 2$ is provided. That is, during the cold engine operation, the intake valve closure timing IVC is retarded in comparison with predetermined stability-limit intake valve closure timing β2. In other words, the maximum advanced IVC can be limited to stability-limit intake valve closure timing β2 during the cold engine conditions, so as to accurately manage the actual compression ratio and thus to ensure the more enhanced combustion stability. The control routine executed by the system of each of the fifth and sixth embodiments is substantially identical to the routine of FIG. 12 executed by the system of the third embodiment (or the second embodiment). Thus, detailed description of steps included in the routine of the system of the fifth and sixth embodiments will be omitted.

In the shown embodiment, although a helical-spline type phase control mechanism is used as variable phase control mechanism 20, another type of variable phase control mechanisms may be used. Instead of using the helical-spline type, a vane-rotor type phase control mechanism may be used. Typical details of such vanetype phase control mechanism has been set forth, for example, in U.S. Pat. No. 5,823,152 issued Oct. 20, 1998 to Masayasu Ushida, the teachings of which are hereby incorporated by reference.

The entire contents of Japanese Patent Application No. P2000-174733 (filed Jun. 12, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A valve operating system of an internal combustion engine enabling both valve working angle and phase to be varied, the valve operating system comprising:
    a working angle control mechanism which variably controls a working angle of an intake valve;
    a first actuator which drives the working angle control mechanism in response to a supply pressure of working fluid;
    a phase control mechanism which variably controls a phase of the working angle of the intake valve;
    a second actuator which drives the phase control mechanism in response to a supply pressure of working fluid;
    a temperature sensor which detects a temperature of the working fluid;
    a control section which controls the supply pressure to each of the first and second actuators; and
    the control section limiting a controlled variable of at least one of the working angle control mechanism and the phase control mechanism in a cold-engine state in which the temperature of the working fluid is less than a predetermined temperature value, as compared to a hot-engine state in which the temperature of the working fluid is greater than or equal to the predetermined temperature value.

2. A valve operating system of an internal combustion engine enabling both valve working angle and phase to be varied, the valve operating system comprising:
    a working angle control mechanism which variably controls a working angle of an intake valve;
    a first actuator which drives the working angle control mechanism in response to a supply pressure of working fluid;
    a phase control mechanism which variably controls a phase of the working angle of the intake valve;
    a second actuator which drives the phase control mechanism in response to a supply pressure of working fluid;
    a temperature sensor which detects a temperature of the working fluid;
    a control section which controls the supply pressure to each of the first and second actuators; and
    a valve open timing of the intake valve being retarded in comparison with a predetermined stability-limit valve open timing, in a cold-engine state in which the temperature of the working fluid is less than a predetermined temperature value.

3. The valve operating system as claimed in claim 1, wherein the phase control mechanism is held at a predetermined maximum retarded phase in the cold-engine state.

4. The valve operating system as claimed in claim 1, wherein the working angle control mechanism is held at a predetermined minimum working angle in the cold-engine state.

5. The valve operating system as claimed in claim 1, wherein a valve closure timing of the intake valve is retarded in comparison with a predetermined stability-limit valve closure timing, in the cold-engine state.

6. The valve operating system as claimed in claim 1, wherein:
    the working angle control mechanism is provided between a drive shaft rotating in synchronism with rotation of a crankshaft of the engine and a rockable cam being oscillatingly fitted onto an outer periphery of the drive shaft so that a cam-contour surface of the rockable cam is cam-connected to the intake valve so as to drive the intake valve by an oscillating motion of the rockable cam, and
    the working angle control mechanism comprises a drive cam fixedly connected to drive shaft so that an axis of the drive cam is eccentric to an axis of the drive shaft and that the drive shaft is rotatable together with the drive cam, a first link fitted to an outer periphery of the drive cam so that the first link is rotatable relative to the drive cam, a control shaft laid out substantially parallel to the drive shaft and driven by the first actuator, a control cam fixedly connected to the control shaft so that an axis of the control cam is eccentric to an axis of the control shaft and that the control shaft is rotatable together with the control cam, and a rocker arm fitted to an outer periphery of the control cam so that the rocker arm is rotatable relative to the control cam, one end of the rocker arm being linked to a tip end of the first link so as to be rotatable relative to the first link, and a second link mechanically linking the rocker arm to the rockable cam therevia, one end of the second link being rotatably linked to the other end of the rocker arm, and the other end of the second link being rotatably linked to a tip end of the rockable cam.

7. The valve operating system as claimed in claim 6, wherein:
    the phase control mechanism comprises an outer cylindrical portion rotating in synchronism with rotation of a crankshaft of the engine, an inner cylindrical portion being rotatable together with the drive shaft which drives the intake valve, a piston interleaved between the outer and inner cylindrical portions and driven axially by the second actuator, and a converter which converts axial movement of the piston into relative rotational movement between the inner and outer cylindrical portions.

8. The valve operating system as claimed in claim 1, further comprising an engine temperature sensor sensing an engine temperature, and wherein the temperature of the working fluid is estimated based on the engine temperature.

9. In an internal combustion engine with a valve operating system enabling both valve working angle and phase to be varied, the valve operating system comprising:

a working angle control means for variably controlling a working angle of an intake valve;

a first hydraulically-operated actuating means for driving the working angle control means in response to a supply pressure of working fluid;

a phase control means for variably controlling a phase of the working angle of the intake valve;

a second hydraulically-operated actuating means for driving the phase control means in response to a supply pressure of working fluid;

a temperature sensing means for detecting a temperature of the working fluid;

a control means for controlling the supply pressure to each of the first and second hydraulically-operated actuating means; and the control means preventing a controlled variable of at least one of the working angle control means and the phase control means from exceeding a predetermined limit only in a cold-engine state in which the temperature of the working fluid is less than a predetermined temperature value.

10. A method for variably controlling both valve working angle and phase of an intake valve of an internal combustion engine with a valve operating system having both a working angle control mechanism variably controlling the working angle of the intake valve in response to a supply pressure of working fluid and a phase control mechanism variably controlling a phase of the working angle of the intake valve in response to a supply pressure of working fluid, the method comprising:

detecting a temperature of the working fluid;

regulating the supply pressure for each of the working angle control mechanism and the phase control mechanism depending on engine operating conditions;

discriminating, responsively to the temperature of the working fluid, that the engine is conditioned in one of a cold-engine state in which the temperature of the working fluid is less than a predetermined temperature value and a hot-engine state in which the temperature of the working fluid is greater than or equal to the predetermined temperature value, and preventing a controlled variable of at least one of the working angle control mechanism and the phase control mechanism from exceeding a predetermined limit only in the cold-engine state.

11. The method as claimed in claim 10, further comprising:

setting, responsively to input information regarding which state the engine is in, an intake valve open timing and intake valve closure timing adjustable area at a first adjustable area which is preprogrammed to be suitable for the hot-engine state;

setting, responsively to input information regarding which state the engine is in, the intake valve open timing and intake valve closure timing adjustable area at a second adjustable area which is preprogrammed to be suitable for the cold-engine state; and driving at least one of the working angle control mechanism and the phase control mechanism depending on the engine operating conditions within the intake valve open timing and intake valve closure timing adjustable area set to either the first adjustable area or the second adjustable area.

12. The method as claimed in claim 11, wherein:

an intake valve open timing is limited to a timing retarded from a predetermined stability-limit valve open timing substantially corresponding to top dead center, in the cold-engine state.

13. The method as claimed in claim 12, wherein:

an intake valve closure timing is limited to a timing retarded from a predetermined stability-limit valve closure timing substantially corresponding to a closure timing advanced from bottom dead center, in the cold-engine state.

14. The method as claimed in claim 11, wherein:

in an uncontrolled state in which the working angle control mechanism and the phase control mechanism are both inoperative, the working angle control mechanism is held at an initial position corresponding to a minimum working angle, while the phase control mechanism is held at an initial position corresponding to a maximum retarded phase; and in the cold-engine state, the phase control mechanism remains inoperative and the working angle of the intake valve is increased from the initial position corresponding to the minimum working angle depending on the engine operating conditions by driving only the working angle control mechanism, so as to advance an intake valve open timing and to retard an intake valve closure timing.

15. The method as claimed in claim 11, wherein:

in an uncontrolled state in which the working angle control mechanism and the phase control mechanism are both inoperative, the working angle control mechanism is held at an initial position corresponding to a minimum working angle, while the phase control mechanism is held at an initial position corresponding to a maximum advanced phase; and in the cold-engine state, the working angle control mechanism remains inoperative and the phase of the intake valve is retarded from the initial position corresponding to the maximum advanced phase depending on the engine operating conditions by driving only the phase control mechanism, so as to retard both an intake valve open timing and an intake valve closure timing.

* * * * *